US011520956B2

(12) United States Patent
Feng et al.

(10) Patent No.: US 11,520,956 B2
(45) Date of Patent: Dec. 6, 2022

(54) SYSTEMS AND METHODS FOR AUTOMATICALLY REALIZING MODELS FOR CO-SIMULATION

(71) Applicant: The MathWorks, Inc., Natick, MA (US)

(72) Inventors: Haihua Feng, Sherborn, MA (US); Tao Cheng, Brighton, MA (US); John E. Ciolfi, Wellesley, MA (US); Pieter J. Mosterman, Waltham, MA (US); Fu Zhang, Sherborn, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 17/352,818

(22) Filed: Jun. 21, 2021

(65) Prior Publication Data

US 2021/0312110 A1 Oct. 7, 2021

Related U.S. Application Data

(63) Continuation of application No. 16/403,959, filed on May 6, 2019, now Pat. No. 11,042,675.

(60) Provisional application No. 62/775,023, filed on Dec. 4, 2018, provisional application No. 62/729,650, filed on Sep. 11, 2018, provisional application No. 62/679,314, filed on Jun. 1, 2018.

(51) Int. Cl.
*G06F 30/20* (2020.01)
*G06F 30/15* (2020.01)
*G06F 30/333* (2020.01)

(52) U.S. Cl.
CPC .............. *G06F 30/20* (2020.01); *G06F 30/15* (2020.01); *G06F 30/333* (2020.01)

(58) Field of Classification Search
None
See application file for complete search history.

(56) References Cited

U.S. PATENT DOCUMENTS 7,580,962 B1    8/2009   Orofino, II
8,209,158 B1 *   6/2012   Fielder .................... G06F 30/33
                                                                                             703/7

(Continued)

OTHER PUBLICATIONS

Bombing, Massimo, et al., "Heterogeneous Systems Co-Simulation: A Model-Driven Approach Based on SysML State Machines and Simulink," 2010, pp. 1-6.

(Continued)

*Primary Examiner* — Steven M Christopher
(74) *Attorney, Agent, or Firm* — Cesari and McKenna, LLP; Michael R. Reinemann

(57) ABSTRACT

Systems and methods automatically construct a realization of a model from an available set of alternative co-simulation components, where the realization meets one or more objectives, such as fidelity, execution speed, or memory usage, among others. The systems and methods may construct the realization model by setting up and solving a constrained optimization problem, which may select particular ones of the alternative co-simulation components to meet the objectives. The systems and methods may configure the realization, and execute the realized model through co-simulation. The systems and methods may employ and manage different execution engines and/or different solvers to run the realization of the model.

34 Claims, 20 Drawing Sheets

(56) References Cited

U.S. PATENT DOCUMENTS

| | | | | |
|---|---|---|---|---|
| 8,457,945 | B1* | 6/2013 | Fielder | G06F 30/33 |
| | | | | 703/22 |
| 9,317,331 | B1* | 4/2016 | Koh | G06F 9/5066 |
| 9,460,239 | B1* | 10/2016 | Yunt | G06F 11/3664 |
| 2017/0061069 | A1* | 3/2017 | Drenth | G06F 30/15 |
| 2018/0349539 | A1 | 12/2018 | Cheng et al. | |
| 2019/0370420 | A1 | 12/2019 | Feng et al. | |

OTHER PUBLICATIONS

Deshpande, Prasanna, et al., "MATLAB EXPO 2017: Simulink as Your Enterprise Simulation Platform," Jun. 2017, pp. 1-56.

Huang, Edward, et al., "Multi-Fidelity Model Integration for Engineering Design," Elsevier, ScienceDirect, 2015 Conference on Systems Engineering Research, Procedia Computer Science, vol. 44, Mar. 16, 2015, pp. 336-344.

Lu, Junzhi, et al., "A Model-Driven Tool-Integration Framework for Whole Vehicle Co-simulation Environments," 8$^{th}$ European Congress on Embedded Real Time Software and Systems (ERTS 2016), Toulouse, France, Jan. 2016, pp. 1-8.

"MiL, SiL, and HiL Applications: ECU Testing and Calibration with GT-SUITE Plant Models," Gamma Technologies, Jan. 2015, pp. 1-2.

Nguyen, Bao, et al., "Co-Simulation of Interconnected Power Electronics Using Simulink-PSpice Interface and Components Defined in C/C++ and SystemC," The MathWorks, Inc., 2016, pp. 1-38.

Nicolescu, G., et al., "Methodology for Efficient Design of Continuous/Discrete-Events Co-Simulation Tools," WMC' 07, Jan. 2007, pp. 172-179.

Otter, Martin, et al., "Functional Mockup Interface—Overview," Modelisar, Jan. 2010, pp. 1-21.

Pohlmann, Uwe, et al., "Generating Functional Mockup Units from Software Specifications," Proceedings of the 9$^{th}$ International Modelica Conference, Munich, Germany, Sep. 3-5, 2012, pp. 765-774.

"Simulink® User's Guide: R2017a," The MathWorks, Inc., Mar. 2017, pp. 1-3856.

"Simulink® User's Guide: R2018a," The MathWorks, Inc., Mar. 2018, pp. 1-4212.

\* cited by examiner

```xml
<Model Component ID>A</Model Component ID>                              —502
<Description>Vehicle Environment</Description>                          —504

<Execution Characteristics>
        <Fidelity>2</Fidelity>                                          —506
        <Ave. Memory Usage>20MB</Ave. Memory Usage>                     —507
        <Peak Memory Usage>40MB<Peak Memory Usage>                      —508
        <Physical Execution Time>2</Physical Execution Time>            —509
        <Simulation Execution Time Per Step>0.1</ Simulation Execution Time Per Step]  —510

<Software Tool >
        <Application Program>Simulink</Application Program>             —512
        <Version>Release2018a</Version>                                 —513
        <Operating System>Linux_x64</Operating System>                  —514
        <Solver>
                <Type>ODE45</Type>                                      —516
                <Relative tolerance>$10^{-6}$</Relative Tolerance>      —517
                <Absolute tolerance>$10^{-3}$</Absolute Tolerance>      —518

<Interfaces>
        <Output>y</Output>                                              —520
        <Input>u</Input>                                                —521
        <State>x</State>                                                —522
        < Output-Input Derivative>dy/du</Output-Input Derivative/>      —523
        < State-Input Derivative>dx/du</State-Input Derivative>         —524
```

FIG. 5

SYSTEMS AND METHODS FOR AUTOMATICALLY REALIZING MODELS FOR CO-SIMULATION

CROSS-REFERENCE TO RELATED APPLICATIONS

This application is a continuation of application Ser. No. 16/403,959, filed May 6, 2019, now U.S. Pat. No. 11,042,675, which claims the benefit of Provisional Patent Application Ser. No. 62/775,023, filed Dec. 4, 2018, for Systems and Methods for Automatically Realizing Models for Cosimulation, Provisional Patent Application Ser. No. 62/729,650, filed Sep. 11, 2018, for Systems and Methods for Automatically Realizing Models for Co-Simulation, and Provisional Patent Application Ser. No. 62/679,314, filed Jun. 1, 2018, for Systems and Methods for Automatically Realizing Implementations of Models for Co-Simulation, which applications are hereby incorporated by reference in their entireties.

BRIEF DESCRIPTION OF THE DRAWINGS

The description below refers to the accompanying drawings, of which:

FIG. 5 is a schematic illustration of example metadata for a model component in accordance with one or more embodiments;

DETAILED DESCRIPTION OF ILLUSTRATIVE EMBODIMENTS

Figure 1:
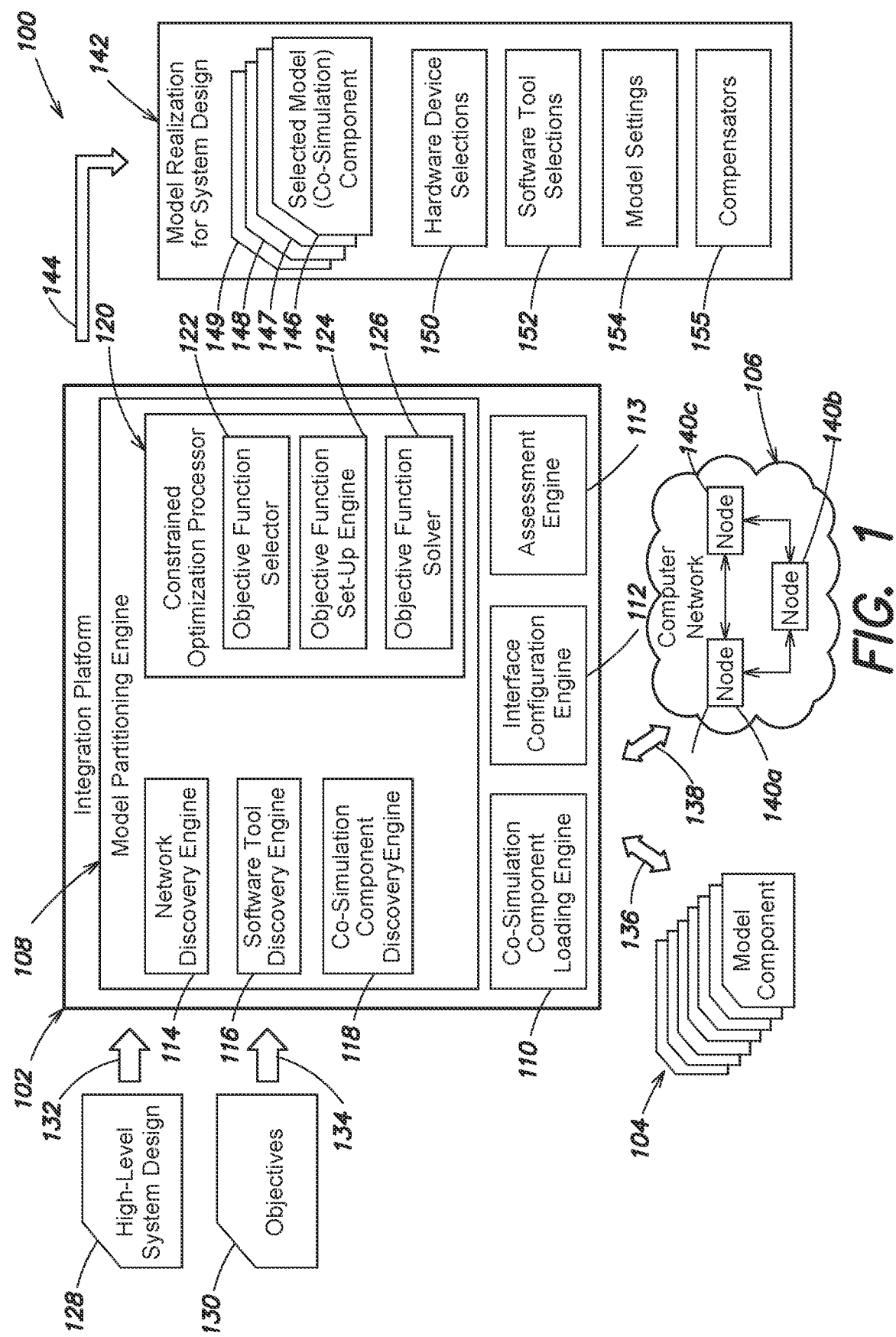
FIG. 1 is a schematic illustration of an example co-simulation environment in accordance with one or more embodiments.

Computer simulation is often used in the design, testing, and building of physical or software systems. Simulation involves creating a computer model of a system. The model may be constructed to mimic the behavior of the system. In some cases, the model may include a plant element and a controller element. The developer may use a software simulation tool, such as a graphical simulation environment, to manually construct a model in the form of a block diagram. The block diagram may be an executable specification, and may be simulated, e.g., executed or run, by the simulation environment using one or more simulation engines. At least some of the graphical blocks in the block diagram can be in a declarative language. A simulation environment that supports such graphical blocks can include the Simulink® model-based design environment from The MathWorks, Inc. of Natick, Mass., among others. Test benches may be created and used on the model for verification and validation of system requirements. Code may be generated for the model, and the generated code, which can be compiled and executed outside of the simulation tool, may be deployed on an embedded or other system. Generated code also may be used in performing hardware-in-the-loop (HIL), software-in-the-loop (SIL), and/or processor-in-the-loop (PIL) simulations.

Simulation models may be hierarchical, and can be built using both top-down and bottom-up approaches. A developer can view the model at a high level, and then drill down through the hierarchy to see increasing amounts of model detail. A model of a complex system, such as a vehicle, for example, may include multiple interconnected components. The components may represent various subsystems, such as the vehicle's engine, transmission, suspension, brakes, controllers, such as electronic control units (ECUs), etc. The components may themselves include other components creating the model's hierarchy.

A simulation environment may include an execution engine that may execute the model using one or more solvers. For example, for a model of a dynamic system, the execution engine may compute the model's states at successive time steps over a specified simulation time. A simulation environment may include several solvers, each embodying a particular approach to solving a model. For example, solvers may be broadly classified as fixed step, variable step, continuous, and discrete. A variable step solver reduces the step size when the states of a model change rapidly. It may also reduce the step size during zero-crossing events to increase accuracy, and increase the step size to avoid taking unnecessary steps when the states of the model change slowly. Continuous solvers use numerical integration to compute continuous states of a model at a current time step based on the states at previous time steps and the state derivatives. Examples of fixed-step continuous solvers include Euler's method, Heun's method, Bogacki-Shampine Formula, Runge-Kutta Formula, and Dormand-Prince Formula. Discrete solvers are used primarily to solve purely discrete models. They compute only a next simulation time step for a model. Discrete solvers may include discrete event solvers, for example, using max plus algebra, event calendars, etc. Other exemplary solvers include Differential Algebraic Equation (DAE) solvers, sparse matrix solvers, and nonlinear equation solvers, among others.

In some cases, a model may be constructed in a single simulation environment and may be simulated, e.g., run, using the execution engine and a selected solver of the single simulation environment. In other cases, a model may be constructed that includes model components that are solved using different execution engines, solvers, e.g., solvers of different types or different solvers of the same type, and/or different tools/software applications. In this case, co-simulation may be used to execute such a model. Model components that are run using co-simulation may also be referred to as co-simulation components. Co-simulation components may be created in different modeling environments, e.g., different software modeling tools, and assembled into a single model.

When a co-simulation component is created, a user may specify modeled sample rates for the elements of the component (e.g., blocks, lines, ports, etc.). The user may specify modeled sample rates for all of the elements, some of the elements, and/or set a global modeled sample rate for the component. In such cases, an execution engine may automatically set the modeled sample rates for elements not specified by the user based on relationships between the elements and the semantics of the co-simulation component to ensure a consistent and executable component. For example, even if the user does not declare a modeled sample rate for a signal between two elements of a component, the signal may inherit or be automatically set with a modeled sample rate (e.g., a continuous-time rate or a discrete-time rate).

An integration platform having a master execution engine and a master solver may be used to execute a model having co-simulation components. A given co-simulation component may be executed using a subordinate execution engine that is the same as or different than the master execution engine. As used herein, the term "subordinate execution engine" refers to an execution engine, e.g., a different execution engine than the master execution engine that interfaces with the master execution engine. The term "subordinate solver" refers to a solver used by the subordinate execution engine and/or a solver used by the master execution engine, which differs from the master solver, to solve the co-simulation component. While the subordinate execution engine and/or subordinate solver may be used to execute the given co-simulation component, the master execution engine may be used to interface with the subordinate execution engines and/or subordinate solvers for other co-simulation components and to communicate data between co-simulation components during execution of the model.

Different execution engines used during co-simulation of a model may progress independently (e.g., in physical time as opposed to logical time) and exchange data at a particular communication rate. The master execution engine may control the exchange of data between the model components that use different subordinate execution engines and/or solvers. The master execution engine may communicate with co-simulation components via interfaces for the co-simulation components. The master execution engine may only have access to content and functionality of a respective co-simulation component that is available via an interface for the co-simulation component. Exemplary interfaces include the Functional Mock-Up Interface (FMI)—an open source interface managed by the Modelica Association Project, the S-Function Application Programming Interface (API) from The MathWorks, Inc. of Natick, Mass., and the GT-SUITE API from Gamma Technologies, LLC of Westmont, Ill.

In some cases, developers may create alternative model components for a given subsystem. For example, developers may create multiple, alternative model components to model the operation of a vehicle's engine. One such model component may model the engine's behavior with a high degree of fidelity, e.g., numerical accuracy, but may take a long time to execute. Another model component may execute relatively quickly, but at the expense of fidelity. Users may wish to build and run simulation models that employ various combinations of these alternative model components in a co-simulation manner.

Briefly, the present disclosure relates to systems and methods for automatically realizing a model from an available set of alternative model components, where the realized model meets one or more objectives, such as fidelity, execution speed, or memory usage, among others. The systems and methods may realize the model by setting up and solving a constrained optimization problem, which may partition a high-level system design and select particular ones of the alternative model components to meet the objectives. The systems and methods may configure the realized model, and may execute it in a co-simulation manner. The systems and methods may employ and manage different execution engines, different solvers, and/or different tools/software applications to run the model components included in the different partitions, such that the model components may be run as co-simulation components and the partitions may represent co-simulation partitions.

In some embodiments, the systems and methods may be implemented in the form of an integration platform that obtains a high-level description of a system design, e.g., for a physical or software system. The integration platform may obtain user-specified objectives for the realization, such as fidelity, execution speed, memory usage, etc., for the entire realization or for different parts. The integration platform may perform component discovery to identify model components that can implement parts of the system design. The integration platform may perform network discovery to identify available data processing machines and determine the processing, memory, and data communication resources of those machines. The integration platform may perform software tool discovery to determine available software tools and versions running on the machines, such as simulation environments, including the execution engines and solvers implemented by the software tools. The integration platform may obtain attributes of the model components available for implementing parts of the system design.

The integration platform may determine a partition of the system design by solving the constrained optimization problem. For example, the integration platform may set up and solve an objective function having variables based on at least some of the network information, the software tool information, the attributes of the model components, and the specified objectives for the realization. Exemplary objective functions include cost functions, energy functions, reward functions, and utility functions. In some embodiments, the integration platform could use machine learning (e.g., statistics, deep learning, etc.) based functions as well. The integration platform may solve the objective function to determine a partitioning of the system design. The solved-for partitioning may include the identity of particular model components to be included in each partition, the identity of data processing machines and software tools for running those model components, and the execution engines and/or solvers to be utilized by those software tools. The solved-for partitioning may also include parameters or other information for configuring interfaces among the partitions, such as compensators, to correct for errors that might otherwise occur during co-simulation. Among other advantages, it may be valuable, e.g., to a user, to be able to use different solvers, different software tools, and different model component implementations to provide more opportunity for a more preferred overall configuration of cosimulation components, their particular implementations (software tool, solver, solver parameters, model components mapped to the cosimulation component, model component implementations) as well as the communication configuration, as opposed to requiring a homogeneous configuration by, for example, only allowing a single software tool. The ability to solve a complex optimization problem that finds the preferred configuration given an objective function and constraints may help the user attain a desired configuration that would have been at least difficult to determine otherwise, resulting in a subpar solution when not practicing this method.

In some embodiments, the solved-for partitioning of the system design may be presented to the user for evaluation. The integration platform may assess the solved-for partition. The platform may perform static or dynamic analysis. For example, it could be an analysis against characterizations of the various elements that go into the configuration problem (e.g., how long a model may take to execute each time step in worst case, how much memory it may use, what the tolerance of the solvers is set to, the communication rate or rates between the various cosimulation components, etc.) It could also be based on running a number simulations and then analyzing the outcome (e.g., how long it takes on average to execute a particular simulation, how much variance there is on computed values between solvers, between communication rates, between model component implementations, etc.). The dynamic analysis may be presented to the user for statistical analysis, and a preferred configuration may be selected based on it. For example, it may be evaluated against the specified objectives. If the developer is not satisfied with the solved-for partition, the developer may alter one or more objectives, and direct the integration platform to determine a new partition. Alternatively or additionally, the developer may impose one or more constraints on the partition that is to be determined. For example, the developer may require that a particular model component, data processing machine, and/or software tool be utilized to implement a portion of the system design. The integration platform may consider such requirements as hard constraints when setting up the objective function. Among other advantages, the platform may provide the user with insight into the performance of a particular partition/configuration, enabling adding or removing preferences for the objective function and constraints such that the overall outcome of the partitioning/configuration is closer to a desired outcome. More specifically, providing insight may enable a user to understand the effect of particular preferences on the global partition/configuration and so understand what is feasible in terms of an overall outcome as well as how to guide the partitioning/configuring to address specific concerns over others.

When an acceptable partition is achieved, the integration platform may implement the realized simulation model. For example, the integration platform may load the selected model components onto the identified data processing machines. It may configure the software tools. For example, the integration platform may configure the software tools to utilize particular execution engines/solvers to execute the model components. It also may configure the interfaces among the co-simulation partitions. For example, the integration platform may insert compensators at the interfaces of and/or within the model components in different co-simulation partitions. A master execution engine of the integration platform may set data communication rates between components and/or configure their local execution engines. It may also specify compensator configurations, such as compensator types, extrapolation/interpolation methods and coefficients, signal correction coefficients, etc.

Some steps of the present disclosure improve user experience and interaction with the simulation environment. Some steps improve simulation efficiency. Some steps improve machine efficiency and memory usage. Some steps improve simulation accuracy and data usability.

Integration Platform

FIG. 1 is a schematic illustration of an example co-simulation environment 100 in accordance with one or more embodiments. The co-simulation environment 100 may include an integration platform 102, a set of model components indicated generally at 104, and a computer network 106. The model components may be developed by the same user or by different users for simulating systems. The integration platform 102 may include a model partitioning engine 108, a co-simulation component loading engine 110, an interface configuration engine 112, and an assessment engine 113. The model partitioning engine 108 may include a network discovery engine 114, a software tool discovery engine 116, a co-simulation component discovery engine 118, and a constrained optimization processor 120. The constrained optimization processor 120 may include an objective function selector 122, an objective function set-up engine 124, and an objective function solver 126. The computer network 106 may include interconnected data processing nodes, such as nodes 140a, 140b, and 140c. The nodes 140a-c may have different processing and memory resources, may be running different Operating Systems, and may be hosting different simulation tools and/or different versions of simulation tools. Exemplary processing resources include single and multi-core CPUs, GPUs, FPGAs, etc.

The integration platform 102 may obtain a high-level system design 128 and one or more objectives 130, as indicated by arrows 132 and 134. The term high-level means that the system design 128 contains few implementation details. For example, the high-level system design 128 may not itself even be executable, and may include only a rudimentary description of the elements that make up the high-level system design 128. In some embodiments, the high-level system design 128 may be in the form of a functional specification, an architectural model, a system representation, a platform model, a structural specification, a behavioral characterization, a behavioral framework, an assume/guarantee structure, a variability model, or a product-line model. The integration platform 102 may have access to the plurality of model components 104, as indicated by arrow 136. For example, a user can provide storage addresses of the model components 104 to the integration platform 102 to load the model components 104 into the platform 102. The integration platform 102 also may have access to the computer network 106, as indicated by arrow 138, for example through a Local Area Network (LAN), the Internet, or other data connection. For example, the integration platform 102 may be running on one or more of the nodes 140a-c.

The integration platform 102 may utilize one or more objective functions to automatically realize a model 142 for the high-level system design 128 that satisfies the objectives 130, as indicated by arrow 144. The model 142 may include selected ones of the model components 104, such as model components 146-149 organized into different co-simulation partitions. The model 142 may also include selections 150 of particular hardware devices within the computer network 106. It may also include selections 152 of particular software simulation tools in the computer network 106. The model 142 may further include model settings 154. The model settings 154 may include information for configuring the particular simulation tools to run the selected model components 146-149, and for configuring interfaces and/or communication links among the selected model components 146-149 included in different co-simulation partitions. The model 142 may include one or more compensators 155. The one or more compensators 155 may not intrinsically be part of the model. It may either be inserted in the model based on analysis before execution or it is incorporated as part of the solver without explicitly being inserted into the model. There may be benefits to either approach. For example, if compensator is inserted in the model, the user can see explicitly where the compensator has been inserted (and perhaps discard it or make it a permanent part of the model). If the compensator is part of the solver, the model does not change (which eliminates potential confusion).

In some embodiments, the co-simulation component loading engine 110 may load the selected model components 146-149 onto particular ones of the nodes 140a-c of the computer network 106 as specified by the selections 150 of hardware devices. The co-simulation component loading engine 110 may also configure the simulation tools of the nodes 140a-c to run the selected model components 146-149 as specified by the selections 152 of software tools. The interface configuration engine 112 may configure interfaces and/or communication links among the selected model components 146-149 included in different co-simulation partitions, for example by inserting the compensators 155. The realized model 142 for the high-level system design 128 may then be co-simulated, e.g., executed to produce co-simulation results. The setup or configuration may be done statically, but there may be reconfiguration for example based on simulation results, in which case such reconfiguration has a dynamic aspect as well.

The integration platform 102 may include or have access to a software simulation tool, such as a simulation environment, which may be implemented on the same or on a different processor as the platform 102. The simulation environment may include one or more execution engines and one or more solvers. The one or more execution engines and solvers may operate as a master execution engine and a master solver for controlling the execution of the realization model 142, for example by managing subordinate execution engines and subordinate solvers implemented by other software simulation tools.

In some embodiments, one or more of the model partitioning engine 108, the co-simulation component loading engine 110, the interface configuration engine 112, and the assessment engine 113 may be implemented through one or more software modules or libraries containing program instructions that perform the methods described herein, among other methods. The software modules may be stored in one or more memories, such as a main memory, a persistent memory and/or a computer readable media, of a workstation, server, or other data processing machine or device, and executed by one or more processors. Other computer readable media may also be used to store and execute these program instructions, such as non-transitory computer readable media, including optical, magnetic, or magneto-optical media.

High-Level System Design

Figure 2:
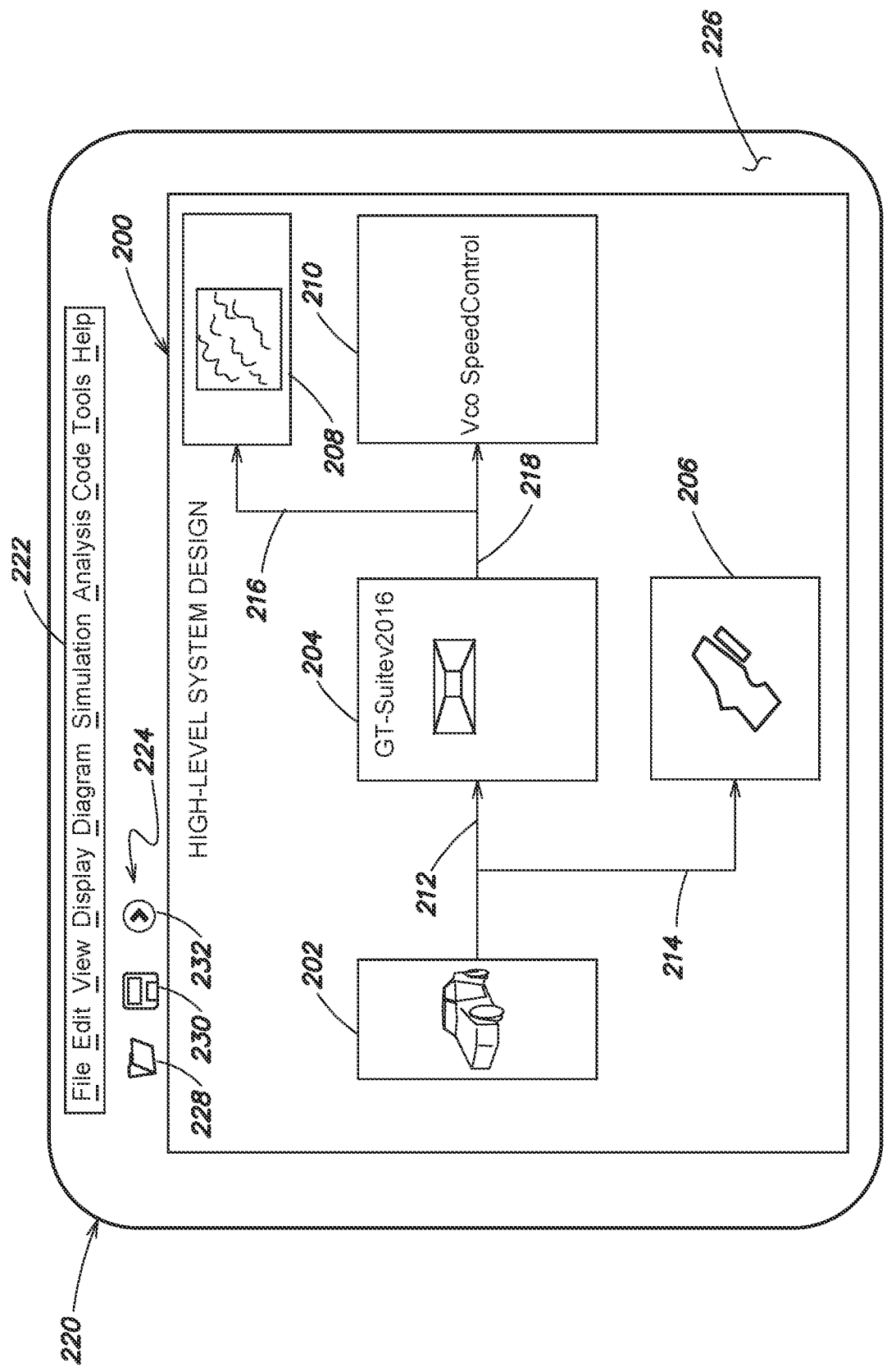
FIG. 2 is a schematic illustration of an example functional structure of a high-level system design in accordance with one or more embodiments.

FIG. 2 is a schematic illustration of an example functional structure 200 of the high-level system design 128 in accordance with one or more embodiments. The high-level system design 128 may represent a vehicle, such as a car, and the functional structure 200 may be graphically defined and may include elements representing particular systems and/or subsystems of the car. For example, the functional structure 200 may include one icon 202 for a vehicle element, another icon 204 for a powertrain element, yet another icon 206 for a driver module, a further icon 208 for a vehicle environment element, and a still further icon 210 for a control element. The control element may be an electronic control unit (ECU), such as an Anti-locking Braking System (ABS), a cruise control system, an Advanced Driver Assistance System (ADAS), etc. In some embodiments, the functional structure 200 of the high-level system design 128 may not itself be executable to simulate the car's behavior or operation. Instead, the functional structure 200 may simply provide an indication of the elements needed to design, test, or implement the control element 210. In some embodiments, the icons 202-210 may be placeholders for executable model components, and may not be executable components themselves. The high-level system design 128 as well the functional structure 200 may thus be software simulation tool-independent and model component-independent.

The functional structure 200 may also include symbols representing data exchanged among the elements of the high-level system design 128. For example, it may include arrows 212 and 214 among the icons 202, 204, and 206, indicating that outputs computed by the vehicle element are accessed as inputs by the powertrain element and the driver element. The functional structure 200 may also include arrows 216 and 218 among the icons 204, 208, and 210, indicating that outputs computed by the powertrain element may be accessed as inputs by the vehicle environment element and the control element. The data may represent physical quantities, such as pressure, temperature, voltage, etc., control signals, and sensor signals, such as video streams, radar signals, etc., among other data. The form of the data exchanged among elements of the high-level system design 128 may vary depending on the model components used to implement the respective elements and the co-simulation partitioning of the design 128. For example, for one model component, the data may be in the form of time varying signals. For other model components, the data may be in the form of messages, events, energy flows, e.g., in the form of through and across variables, signals, such as time-based signals, token flow, data flow, entity flow, and shared access variables. For ease of description, the data exchanged among model components is described herein as time-varying signals, such as the signals defined in the Simulink® model-based design environment. However, it should be understood that other forms of data may be exchanged instead of signals. Furthermore, while uni-directional arrows are illustrated in the figure, it should be understood that data may be exchanged across bi-directional and non-directional connections.

As described, the icons 202-210 may be placeholders for executable model components. For example, the high-level system design 128 may be a Uniform Modeling Language (UML) diagram, Systems Modeling Language (SysML) diagram, or an AUTomotove Open System Architecture (AUTOSAR) specification, among others. In other embodiments, one or more of the icons 202-210 may represent executable model components of a particular software simulation tool. For example, in some implementations, one or more of the icons 202-210 may be model reference blocks, subsystems, Virtual Instruments (VIs), and/or variants of the Simulink model-based design environment, Functional Mock-up Units (FMUs), Dynamic Link Libraries (DLLs), etc. In some embodiments, the high-level system design 128 may be textually defined.

The functional structure 200 may be presented on a display of a data processing device, such as a workstation, laptop, tablet, etc. For example, the functional structure 200 may be presented on a model editor window 220. The model editor window 220 may include a plurality of user interface elements and/or windows elements (widgets), at least some of which may be operated by a user to construct, edit, and save, a high-level system design, and to command the model partitioning engine 108 to automatically realize a model from the high-level system design 128, among other operations. For example, the model editor window 220 may include a menu bar 222, a toolbar 224, and a canvas 226. The menu bar 222 may include a plurality of commands, and the commands may be organized into drop-down categories, such as File, Edit, View, Display, etc. The toolbar 224 may include a plurality of graphical command buttons for executing frequently used commands. For example, the toolbar 224 may include an Open button 228, a Save button 230, and a Partition button 232, among others.

The high-level system design 128 may be implemented in the form of one or more objects, files, or other data structures stored in memory. The integration platform 102 may be configured to open the high-level design 128, and understand the functional structure 200.

Exemplary integration platforms include the MATLAB® language/programming environment and the Simulink® simulation environment both from The MathWorks, Inc. of Natick, Mass., as well as the Simscape™ physical simulation system, the SimEvent® discrete-event simulation tool, and the Stateflow® state chart tool also from The MathWorks, Inc. The MATLAB language/programming environment is a math-oriented, textual programming environment. The Simulink simulation environment is a block diagram based design environment for modeling and simulating systems, such as physical systems. The MATLAB and Simulink environments provide a number of high-level features that facilitate algorithm development and exploration, and support simulation and model-based design, including late binding or dynamic typing, as opposed to describing a late binding language or a dynamic typed language/environment, array-based operations, data type inferencing, sample time inferencing, and execution order inferencing, among others.

It should be understood that the functional structure 200 of FIG. 2 is meant for illustrative purposes only and that the high-level system design 128 may be displayed or represented in other ways. For example, the high-level system design 128 may be represented textually as opposed to graphically.

Identification of Alternative Model Components for Building a Model

The set 104 of model components may include model components designed or configured, e.g., by different users of the same or different organizations, for execution by a number of different software simulation tools and/or by particular execution engines and/or solvers of a software simulation tool. Exemplary software simulation tools include the MATLAB® language/programming environment, the Simulink® simulation environment, the Simscape™ physical simulation system, the SimEvent® discrete-event simulation tool, the Stateflow® state chart tool, the CarMaker vehicle test platform from IPG Automotive GmbH of Karlsruhe, Germany, the GT-SUITE simulation environment from Gamma Technologies, LLC of Westmont, Ill., the COMSOL Multiphysics simulation software from COMSOL AB of Stockholm, Sweden, the ASCET-DEVELOPER application software from ETAS GmbH of Stuttgart, Germany, the Simulia and Abaqus simulation products from Dassault Systèmes Simulia Corp. of Vélizy-Villacoublay France, the SolidThinking Activate product from Altair Engineering, Inc. of Troy, Mich., the ANSYS simulation software from Ansys, Inc. of Canonsburg, Pa., Siemens PLM software from Siemens AG of Berlin, Germany, simulation tools from MSC Software Corp. of Newport Beach, Calif., the LabVIEW virtual instrument system from National Instruments, Inc. of Austin, Tex., the Saber simulation tool from Synopsys, Inc. of Mountain View, Calif., and the Virtuoso® design platform from Cadence Design Systems, Inc. of San Jose, Calif., among others.

One or more of the simulation tools may implement and/or support a declarative language. A declarative language is a language that expresses the logic of a computation without describing its control flow. A declarative language may describe what a program must accomplish in terms of the problem domain, rather than describe how to accomplish it as a sequence of the programming language primitives. In some cases, a declarative language may implement single assignment in which variables are assigned once and only once. Examples of declarative languages include the Simulink® model-based design environment from The MathWorks, Inc. of Natick, Mass., the Modelica simulation language from the Modelica Association, the LabVIEW graphical programming system from National Instruments Corp., Hardware Description Language (HDL), the Prolog language, and the Haskell language, among others. Behaviors of at least some of the model components may include computational implementations that are implicitly defined by a declarative language.

For any given element of the high-level system design 128, there may be a number of different model components from the set 104 that can model the given element. Each of these model components may represent an alternative way of simulating the element. Accordingly, there may be one subset of model components that model the vehicle element, another subset of model components that model the powertrain element, and so on. In some cases, a given model component may model multiple elements of the high-level system design 128 or several model components may model a single element of the design 128. The co-simulation component discovery engine 118 may evaluate the model components included in the set 104, and identify the subsets of model components that model the various elements of the high-level system design 128. The co-simulation component discovery engine 118 also may obtain attributes of the identified, alternative model components. For example, at least some model components may be stored in one or more libraries, e.g., of a simulation environment, and alternative model components identified as variants. Example library and variant functionality is described in the Simulink User's Guide (The MathWorks, Inc. March 2017), which is hereby incorporated by reference.

Figure 3:
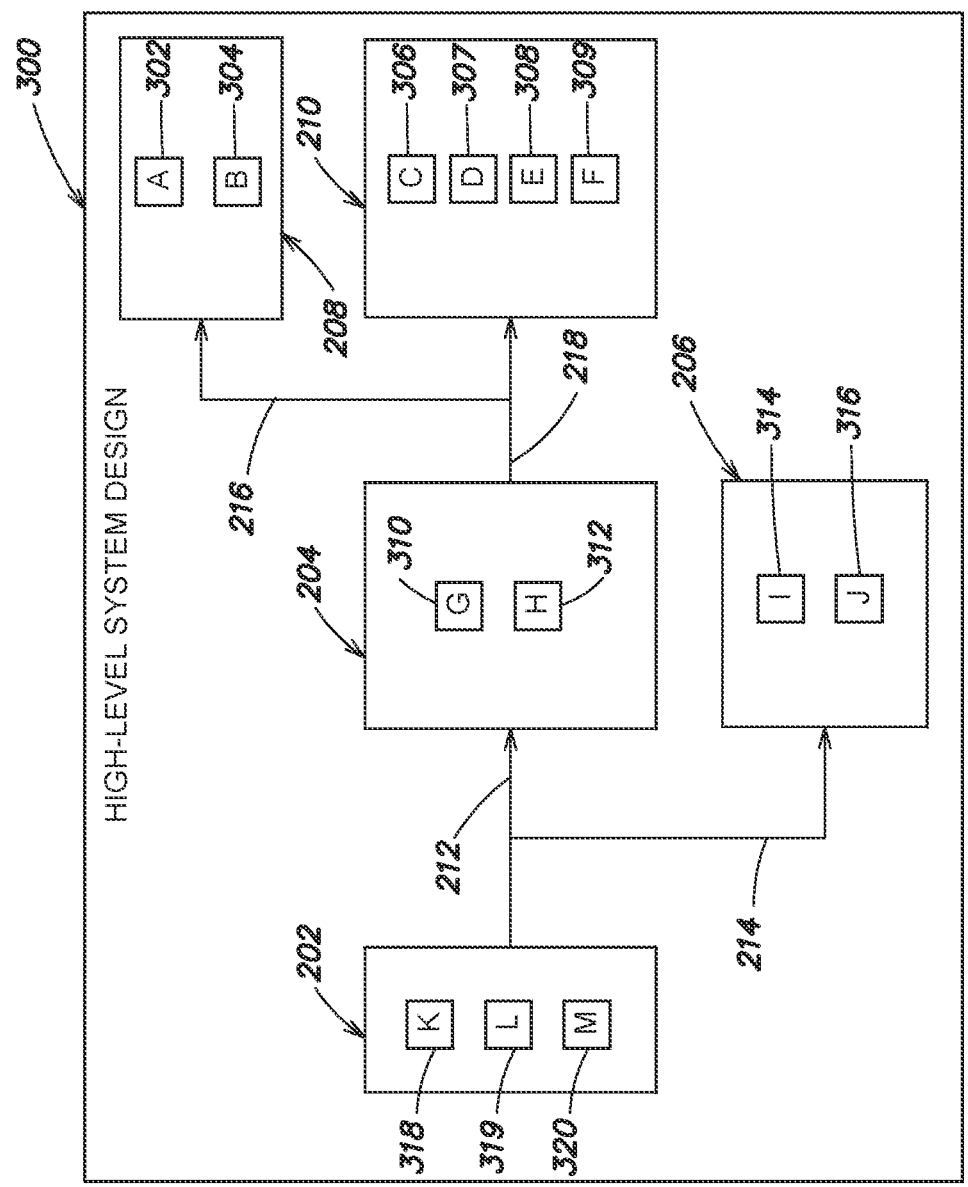
FIG. 3 is a schematic illustration of an example graphical representation of a high-level system design in accordance with one or more embodiments.

FIG. 3 is a schematic illustration of an example graphical representation 300 of the high-level system design 128 in accordance with one or more embodiments. The graphical representation 300 illustrates the subsets of model components found to model the elements of the high-level system design 128. For example, the vehicle environment element may be simulated by two alternative model components, which are represented at the icon 208 by blocks 302 and 304 labeled 'A' and 'B'. The controller element may be simulated by four alternative model components, which are represented at the icon 210 by blocks 306-309 labeled 'C', 'D', 'E', and 'F'. The powertrain element and the driver element may each be simulated by two alternative model components, which are represented at the icons 204 and 206 by blocks 310, 312, 314, and 316, labeled 'G', 'H', 'I', and 'J'. The vehicle element may be simulated by three alternative model components, which are represented at the icon 202 by blocks 318-320 labeled 'K', 'L', and 'M'. In some embodiments, the integration platform 102 may present the graphical representation 300, e.g., on the model editor window 220 in place of or in addition to the function structure 200.

In some embodiments, at least some of the model components included in the set 104 may have associated metadata. The metadata may include a description or characterization of the system simulated by the respective model component, e.g., vehicle dynamics, powertrain, driver, electronic control unit (ECU), etc. The co-simulation component discovery engine 118 may access and analyze this metadata to identify the model components that can simulate a given element of the high-level system design 128. For example, the platform may look for a model component that has fast simulation time, low memory usage, but with a lower fidelity. In other scenarios, the platform may look for a high fidelity model component with a higher computational resource demand.

In some embodiments, the metadata may conform to an encoding standard, such as the eXtensible Markup Language (XML) standard, and the co-simulation component discovery engine 118 may be configured to read such XML files.

The alternative model components that simulate a given element of the high-level system design 128 may be in different forms, and may have different characteristics and/or attributes. One characteristic of a model component is its simulation fidelity, which may also be referred to more simply as fidelity. Simulation fidelity refers to the numeric accuracy with which a model component simulates the behavior and/or operation of the element or system being modeled. Simulation fidelity may be broadly categorized as low simulation fidelity, medium simulation fidelity, and high simulation fidelity. A low simulation fidelity model for example may make many simplifying approximations and assumptions, such as the absence of drag, a small number of states of a state machine, only a few degrees of freedom, Lookup Tables (LUTs) with only a few data points, linear modeling, reduced order, data and/or feature compressed, etc. A low simulation fidelity model may be a model trained using machine learning algorithms, such as logistic regression, neural network, etc. On the other hand, a high simulation fidelity model may account for drag, have many states for a state machine, may represent many degrees of freedom, include LUTs having many data points, etc. A medium simulation fidelity model may fall between a low fidelity model and a high fidelity model in terms of accurately simulating the behavior and/or operation of the system being modeled.

A further characteristic of a model component is its model fidelity. Model fidelity refers to the extent or degree to which a component physically represents the system being modeled. Model fidelity also may be broadly categorized as low model fidelity, medium model fidelity, and high model fidelity. Suppose, for example, that the system being modeled is an automobile. A low model fidelity component of the automobile may only include one wheel element. A medium model fidelity component of the automobile may include two wheel elements. A high model fidelity component may include four wheel elements, like the automobile, as well as other elements representing other parts of the automobile. The high model fidelity component may more closely resemble the physical characteristics of the automobile as compared to the low and medium model fidelity components. Depending on the automobile characteristic(s) that is of interest to a user, for example acceleration, a low to medium model fidelity component may be as accurate as a high model fidelity component. In some implementations, a user may run a high model fidelity component to identify parameters and parameter values that result in highly accurate numeric simulation of the automobile. These parameter values may then be used with a low or medium model fidelity component to achieve similar numeric accuracy, but with the low or medium model fidelity component. In other embodiments, parameters and parameter values may be identified using experimental data.

Another characteristic of a model component is memory usage. Memory usage may refer to the amount of memory resources, such as Random Access Memory (RAM), of a data processing machine needed to run the model component. For example, a model component in the form of a block diagram having hundreds of blocks each implementing a dynamic system, and many LUTs with large numbers of data points for determining intermediate results may consume significant memory resources. Another model having only a few blocks and using functions rather than LUTs to compute intermediate results may consume fewer memory resources.

Yet another characteristic of a model component is execution speed. Execution speed may refer to the physical time it takes for a model to execute. For example, depending on the processor resources of the machine on which it is being executed, a model that includes thousands of blocks may take many hours or even days to run. In contrast, a model that includes a small number of blocks, e.g., tens of blocks, may be executed in a matter of seconds or less.

A further characteristic of a model component is tolerance. In some embodiments, one or more variable-step solvers may use standard control techniques to monitor the local error at each time step. During each time step, the solvers may compute the state values at the end of the step and determine a local error—the estimated error of these state values. The solvers may then compare the local error to an acceptable error, which may be a function of both a relative tolerance (rtol) and an absolute tolerance (atol). If the local error is greater than the acceptable error for any one state, the solvers may reduce the step size and try again. The Relative tolerance may measure the error relative to the size of each state. The relative tolerance may represent a percentage of the state value. A default relative tolerance of 1e-3 means that the computed state is accurate to within 0.1%. The Absolute tolerance may be a threshold value that represents an acceptable error as the value of the measured state approaches zero. A model component may have a global absolute tolerance value that applies to all states in the model component. The global absolute tolerance value may be user settable. As simulation of the model component progresses, the absolute tolerance for each state may reset to the maximum value that the state has assumed so far, times the relative tolerance for that state. Absolute tolerance values may also be specified for some model elements, e.g., blocks, such as the Integrator, State-Space, and Zero-Pole blocks of the Simulink® model-based design environment. An absolute tolerance specified for a block may override the global absolute tolerance set for the model component. A model component's tolerance value may thus determine how accurate an integration result of a model component is.

It should be understood that other characteristics of model components may be specified for the model components, such as frequency response, computation complexity, whether the component uses Jacobian matrices, whether the component uses mass matrices for acausal physical system simulation, and software cost.

Software simulation tools may also have different characteristics and/or attributes. For example, one characteristic of a simulation tool or suite of simulation tools is code generation. That is, some simulation tools and/or some versions of a simulation tool may support code generation either by the tool itself or through related tool, such as a related code generator. Furthermore, the simulation tools that can generate code for model components may only be able to generate code that conforms to certain programming languages. Exemplary programming languages include Ada, Basic, C, C++, C#, SystemC, FORTRAN, VHDL, Verilog, a vendor or target specific HDL code, such as Xilinx FPGA libraries, assembly code, etc. Other characteristics and/or attributes of software simulation tools include cross application/process communication overhead, startup/shutdown execution costs, and processor and memory consumption, among others.

Setting Objectives

In some embodiments, one or more of the objectives 130 for realizing an implementation of a simulation model may be user-specified.

Figure 4:
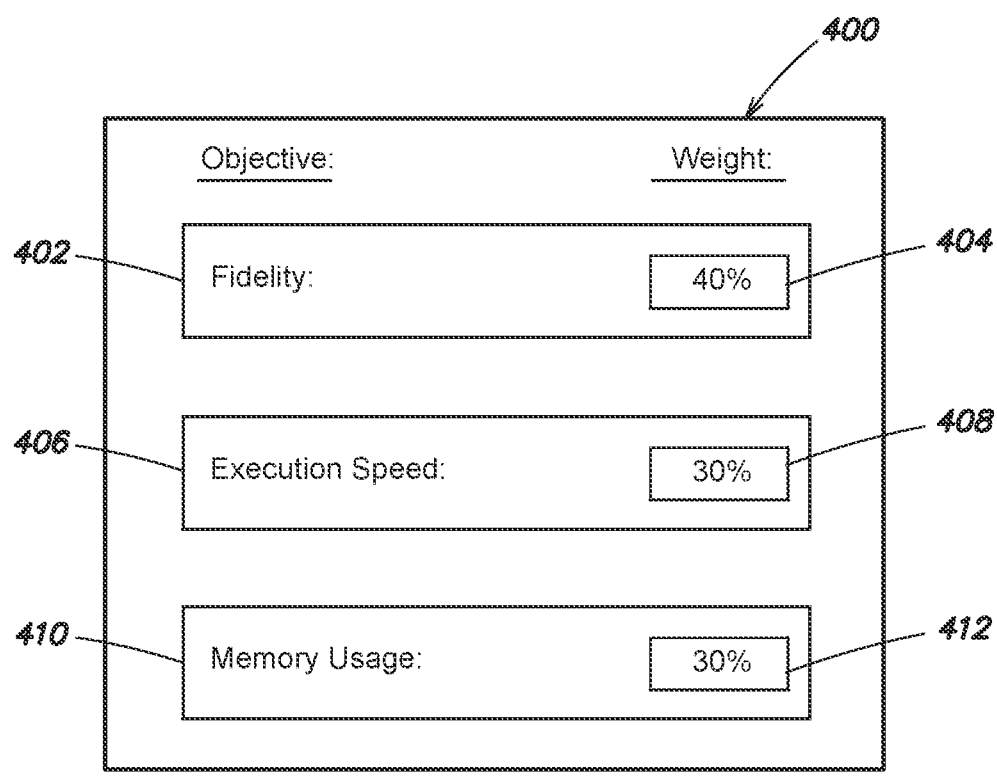
FIG. 4 is a schematic illustration of an example graphical affordance in accordance with one or more embodiments.

FIG. 4 is a schematic illustration of an example graphical affordance 400 in accordance with one or more embodiments. The graphical affordance 400 may be implemented in the form of a Graphical User Interface (GUI), which may be used by a developer to set values for one or more of the objectives 130. The specified values may be obtained by the integration platform 102. As described, the integration platform 102 may utilize the values of the objectives 130 together with additional information to automatically realize the model 142 for the high-level system design 128.

The GUI 400 may include a plurality of elements for setting values for the objectives 130. For example, the GUI 400 may include an element 402 having a data entry box 404 through which a value for a fidelity objective may be set. The GUI 400 may further include another element 406 having a data entry box 408 through which a value for an execution speed objective may be set. The GUI 400 may include yet another element 410 having a data entry box 412 through which a value for a memory usage objective may be set.

A user may specify desired values for the objectives 130 by entering those values into the respective data entry boxes 404, 408, 412. In some embodiments, the values may be in the form of weights specified as percentages. For example, the user may specify a weight of 40% for the fidelity objective, a weight of 30% for the execution speed objective, and a weight of 30% for the memory usage objective. The sum of the weights may need to equal 100%.

It should be understood that the GUI 400 is meant for illustrative purposes. For example, in some implementations, other graphical affordances and/or Command Line Interfaces (CLIs) having additional and/or other objectives may be used. Another objective may indicate that the realized model be created from model components for which code matching a particular programming language, such as C++ or HDL code, can be generated. This objective might be used if the user wants to evaluate the realized model through Hardware-in-the-Loop (HIL) or Software-in-the-Loop (SIL) testing.

In some embodiments, the objectives may be specified in other forms besides weights and/or percentages.

In some embodiments, one or more of the objectives may be determined programmatically.

One exemplary objective function uses a weighted sum of all model components. For example, the overall objective of the integrated model may be in the form of a weighted sum of each component's Tolerance, which could be relative or absolute, execution time, and memory consumption. These weights could be specified by users or could be estimated by using machine learning from training data set. Such an objective function may take the form of:

$$E = \sum_{i=1}^{Nc} (\lambda_i * Tol_i + \alpha_i * C_i + \beta_i * M_i)$$

where,

Nc is the total number of model components being analyzed;

λ is the weight for the tolerance of the model component,

Tol is the tolerance of the model component;

α is the weight for the computation time of the model component,

C is the computation time of the model component,

β is the weight for the memory usage of the model component, and

M is the memory usage of the model component

A goal may be to pick one component candidate for each i. Exemplary Tol values are 1E-3, 1E-3. C values could be normalized (0.1 means fast and 1 means slow). M values could also be normalized (0.1 means low memory usage and 1 means high memory usage). The three weight coefficients, λ, α, and β, may also be normalized.

In some embodiments, the objective function may take the form of harmonic mean or geometric mean, for example depending on desired objective properties.

The optimization problem solved by the objective function may be a mixed discrete—continuous optimization problem, which may present challenges such as searching a large search space and finding or obtaining local minimums. The objective function may utilize one or more constrained nonlinear optimization algorithms, such as trust region reflective algorithm, active set algorithm, Sequential Quadratic Programming (SQP) algorithm, or interior point algorithm, among others.

Additional constraints that may be placed on the objective function may include size of the search space, regularization to reduce variance, and the number of orders in the objective function. One or more of these constraints may be adjustable, e.g., by a user through one or more User Interfaces.

Simulation Model Component Discovery

In some embodiments, information concerning a model component's fidelity, memory usage, execution speed, or other objectives may be included in the component's XML data. The co-simulation component discovery engine 118 may access the metadata and extract this information.

FIG. 5 is a schematic illustration of example metadata 500 for a model component in accordance with one or more embodiments. The metadata 500 may be associated with the model component that corresponds to the block 302 (FIG. 3) labeled 'A'. The metadata 500 may include an entry 502 that identifies the co-simulation component, e.g., as model component 'A'. The metadata 500 may include an entry 504 that provides a description of the model component. The description may indicate that the model component simulates a vehicle. The metadata 500 may include execution characteristics for the model component. For example, the metadata 500 may include an entry 506 for fidelity, two entries 507 and 508 for memory usage, e.g., average and peak memory usage, and two entries 509 and 510 for execution speed, e.g., physical execution time and simulation execution time.

In some embodiments, the values for fidelity, memory usage, and execution speed may be determined by a user, and manually included in the metadata. For example, values may be determined empirically by the author who created the model component. As indicated, the model component represented by the block 302 has a fidelity value of '2', an average memory usage value of 20 megabytes (MB), a peak memory usage of 40 MB, an physical time execution speed value of 2 seconds (for example on a benchmark processor, such as an Intel Core i7), and a simulation execution time per step of 0.1.

The metadata 500 may include information concerning the software simulation tool needed to simulate, e.g., run, the model component represented by the block 302. For example, the metadata data 500 may include three entries 512-514 that indicate the name of the tool, e.g., Simulink, the version of the tool, e.g., Release 2018a, and the Operating System, e.g., Linux, 64-bit. To the extent the software tool supports multiple solvers, the information concerning the software tool may also include information about the particular solver. For example, the metadata 500 may include three entries 516-518 that indicate the solver's type and tolerance. Values may be specified by the author who created the model component. For example, the block 302 may use a Runge-Kutta variable-step continuous solver (ODE45), with a relative tolerate of $10^{-6}$, and an absolute tolerance of $10^{-3}$. Had the model component used a fixed-step solver, then a simulation time step size, e.g., 0.01 seconds, may be specified instead of relative and/or absolute tolerances.

The metadata 500 may further include information concerning the interface of the model component. For example, the metadata 500 may include entries 520-524 for the component's output(s), input(s), state(s), and derivative(s). As shown, the model component includes an output named 'y', an input named 'u', a state named 'x', and two derivatives named 'dy/du' and 'dx/du'.

In some embodiments, the metadata 500 may also include attributes for the output(s), input(s), state(s), and derivative (s), such as data type, nominal or default value, minimum and maximum ranges, signal shape, size, whether the value is real or complex, units, etc. In some implementations, the interface information may also include the Jacobian matrix.

It should be understood that FIG. 5 is intended for explanation only, and that additional, fewer, or other information may be included.

The co-simulation component discovery engine 118 may access metadata for the other alternative model components identified for the high-level system design 128, and extract parameters from that metadata. For example, the co-simulation component discovery engine 118 may obtain the following parameters for the model component that corresponds to the block 304 (FIG. 3) labeled 'B':

Execution Characteristics
Fidelity: 10
Memory Usage: 100 MB
Execution Speed: 5 seconds
Software Tool
Application Program: GT SUITE
Version: Release 2017
Operating System: Windows, 64-bit
Solver
Type: Adams-Bashforth-Moulton PECE variable-step continuous solver (ODE113)
Relative tolerate: $10^{-8}$
Absolute tolerance: $10^{-5}$
Interface
Output: y
Input: u
State: x
Output-Input Derivative: dy/du
State-Input Derivative: dx/du The co-simulation component discovery engine 118 may obtain the following parameters for the model component that corresponds to the block 318 labeled 'K':

Execution Characteristics
Fidelity: 5
Memory Usage: 20 MB
Execution Speed: 1 second
Software Tool
Application Program: CarMaker
Version: Release 2016
Operating System: Windows, 64-bit
Solver
Type: Euler's Method fixed-step continuous solver (ode1)
Step size: 0.01
Interface
Output: y
Input: u
State: x
Output-Input Derivative: dy/du
State-Input Derivative: dx/du As described, there may be multiple, alternative model components available for simulating a given element of the high-level system design 128, and each component may be a model of that element. For example, for the powertrain element, one model component may be a GT-SUITE model, while another model component for the powertrain element may be a Simulink model.

Computing Compensation Parameters

In co-simulation, the data exchanged between co-simulation components may be restricted to discrete-time communication rates. This may be so even though the connection between two co-simulation components may be modeled at a sample rate that differs from the discrete time communication rate at which data is exchanged. Co-simulation may be especially challenging when a connection is intended to be modeled at a continuous-time rate (e.g., the connection is declared as continuous-time). As used herein, continuous-time refers to a connection that is intended to have or represents a value that varies continuously with time but may in fact be discretized by a solver in order to be solved. This value may be approximated by a solver (e.g., a subordinate solver) at various intermediate points within a time step based on a numerical integration scheme to approximate the continuous-time. Such discretization and approximation for continuous-time is separate from the discretization that co-simulation introduces to the connection between two co-simulation components. When such a model is executed in a co-simulation manner, the communication rate for the connection may not be the same as the modeled-sample rate for the connection (e.g., that would be modeled if co-simulation was not used).

As discussed, an input or output signal of a co-simulation component that is declared to have a modeled sample rate (e.g., a continuous-time rate or a discrete-time rate) may be discretized in a model based on the communication rate set for the co-simulation framework. For example, while the signal may still be a continuous-time signal from a user's perspective (e.g., a signal representing pressure or voltage that changes over time), because execution of the model is restricted to discrete communication times in co-simulation, the signal is not simulated as a continuous-time signal as the user expects.

Sometimes, a co-simulation framework may artificially change properties of a model that cause the discrete communication times between co-simulation components. This can lead to inaccuracies or errors/approximations in the simulated behavior of the system. For example, an output of a co-simulation component may be artificially sampled and held before being communicated to another co-simulation component. Because of the artificial sample and hold, a communication of data via the signal between the connected co-simulation components may have a discrete-time communication rate that is different from the continuous-time modeled sample rate or the discrete-time modeled sample rate declared for the signal. This difference in the communication rate of data between co-simulation components and the modeled sample rate (e.g., a continuous-time modeled sample rate or a discrete-time modeled sample rate) declared for the signal may cause data generated by a co-simulation component at particular time steps to be lost, unavailable, delayed, or inaccurate. These errors may confuse a user who set a signal to be continuous-time or discrete-time when the signal is modeled at a different rate due to the model being executed in a co-simulation framework.

The co-simulation component discovery engine 118 may automatically (e.g., independent of user input) identify one or more discrepancies between a sample rate of a connection between two of the available model components 302-320 and the communication rate that would be set if those particular model components were included in the realized model and connected across a co-simulation partition. In addition, the discovery engine 118 may find that two model components are tightly coupled, which means their dynamics are tightly coupled and signals between them change rapidly over time. The discovery engine 118 may identify these signals, and the constrained optimization processor 120 may place the two model components into one co-simulation partition, instead of splitting them into different partitions. For example, the co-simulation component discovery engine 118 may automatically identify continuous-time signals between two of the available model components that, if included in the realized model, would be discretized in co-simulation. The co-simulation component discovery engine 118 may compute compensation parameters to compensate for the inaccuracy caused by co-simulation. For example, the co-simulation component discovery engine 118 may determine the parameters for a compensator (e.g., an algorithm for compensating for an error occurring during execution of a model that places the two model components in different co-simulation partitions) to compensate for the error. The co-simulation component discovery engine 118 may also determine a location for the compensator, such as between the two co-simulation components or inside one of them. Locating a compensator between two co-simulation components may be referred to as explicit compensation, while locating a compensator inside a co-simulation component may be referred to as implicit compensation.

In some implementations, an interface extension (e.g., an API extension) for an interface of a co-simulation component may be provided that allows a callback to be included in functionality of the co-simulation for implicit compensation. In some implementations, the ability to perform implicit compensation by inserting a compensator inside a co-simulation component may provide a more accurate simulated behavior when the model is executed than with explicit compensation where the compensator is inserted outside of the co-simulation component. For example, the master execution engine may determine to perform implicit compensation, and insert compensator within co-simulation component, based on determining that co-simulation component applies a non-linear function to a signal before an integration function.

In some cases, the interface for a co-simulation component may specify a compensation callback function that allows the master execution engine to insert a compensator inside the co-simulation component. In some implementations, a language/programming environment or the master execution engine thereof that creates the interface for a co-simulation component (e.g., when the co-simulation component is created) may determine that co-simulation component applies a non-linear function to the signal before the integration function. Based on this determination, the master execution engine may add the callback function to the interface and allow the master execution to invoke the callback function to perform implicit compensation during execution. In other words, the interface may have a particular callback function that allows an input to the co-simulation component to be transformed at a particular location by an algorithm. In some implementations, the interface may not natively include the compensation callback function. In such cases, the compensation callback function may be created and added to the interface by the master execution engine and/or integration platform to provide the interface with the functionality required to perform implicit compensation. Alternatively, the interface for a co-simulation component may be originally generated to include the callback function capability. In some implementations, an API specification for the interface may include an indicator (e.g., a flag) that indicates whether the compensation callback function is available. The master execution engine may query this flag to determine if implicit compensation is possible based on whether the flag indicates the compensation callback function is available.

Accordingly, during execution of the model, when the master execution engine instructs the co-simulation component to make a time step, the master execution engine may include a compensator (e.g., a compensation algorithm) as an input in the particular callback function, when calling the callback function, to perform the implicit compensation. In this way, a master execution engine may correct for the error introduced into execution of a model executed in a co-simulation manner using explicit compensation and/or implicit compensation The co-simulation component discovery engine 118 may analyze the available model components 302-320 to determine properties of input and output signals. The signal properties may include a time domain (e.g., a continuous-time signal that represents a physical quantity, a discrete-time signal, etc.), a frequency domain, and/or user specified information (e.g., a user specified moving average filter). For example, the modeled sample rate of an input or output signal may be obtained by the co-simulation component discovery engine 118 based on the modeled sample rate set for signal when the respective model component was created or compiled.

The co-simulation component discovery engine 118 may obtain information on the model components in a number of ways. For example, the co-simulation component discovery engine 118 may analyze the model components 302-320 via respective interfaces and obtain component properties. The interface may be an FMI or an S-function API. The S-function API includes a calling syntax used by system-functions (e.g., S-functions) in the Simulink® model-based design environment that enable interaction with the execution engine of the Simulink® model-based design environment. The co-simulation component discovery engine 118 may also obtain information about the model components 302-320 via a JavaScript Object Notation (JSON) interface. Additionally or alternatively, the co-simulation component discovery engine 118 may obtain the information from one or more files (e.g., eXtensible markup language (XML) files) for the model components 302-320.

The information can indicate properties and/or capabilities of the model components 302-320, e.g., characterized by flags or other mechanisms. For example, the information may indicate a type of port (e.g., a derivative input port), a use of variable communication step sizes, or higher order signal extrapolation, or other properties. The interface for a component may provide information regarding properties of the data input and/or output of the component to the co-simulation component discovery engine 118. The properties of the model components 302-320 may be set based on user input and/or from a co-simulation architecture (e.g., by directly adopting values set in the architecture, analyzing computational resources and setting properties based on the capabilities of the computational resources (e.g., available memory, processing speed), etc.).

In some implementations, the communication rate for an input or output signal of a model component may be determined based on user input. In some implementations, the communication rate may be automatically determined by the co-simulation component discovery engine 118. For example, the communication rate may be based on the sample rates set for input or output signals or ports of the model components 302-320.

In some cases, interfaces for one or more of the available model components 302-320 may be limited in that the co-simulation component discovery engine 118 may be unable to access information related to the particular content of the model components 302-320 or related to the functionalities of blocks included in the co-simulation components. For example, the co-simulation component discovery engine 118 may only be able to access information related to the inputs and outputs of some of the model components 302-320 via the interface. In some implementations, the co-simulation component discovery engine 118 may have access to limited information when the execution engine utilized by the co-simulation component discovery engine 118 is different than the execution engine used to execute a model component in a model.

Furthermore, during execution, only instructions directing the model component to move a step forward and/or backwards, update a state, restore a state, or other limited functionality may be possible via the interface. In some implementations, some of the co-simulation components 302-320 may be Functional Mock-Up Units (FMUs) where the computational operations applied to data within the components (e.g., applying a square root function to the signal and then later applying an integrator) and the connectivity between the computational operations are unknown or unavailable to the co-simulation component discovery engine 118.

For example, a GT-SUITE model may be implemented as an S-function of the Simulink® model-based design environment. If the co-simulation component discovery engine 118 relies on the Simulink execution engine to analyze components, the co-simulation component discovery engine 118 may have limited access to the content of the GT-SUITE model.

The information available to the co-simulation component discovery engine 118 via the interface may indicate the computational operations applied by the model component 318. In some implementations, the co-simulation component discovery engine 118 may have access to such information when the execution engine utilized by the co-simulation component discovery engine 118 is the same execution engine used to execute the model component 318. However, the co-simulation component discovery engine 118 may have access to such information regardless of whether the same execution engines and/or software application tools are used.

Network Resource Discovery

The network discovery engine 114 may scan the computer network 106, and obtain information concerning the data processing devices in the computer network 106. The information may include hardware and software resources of the nodes 140a-c.

Figure 6:
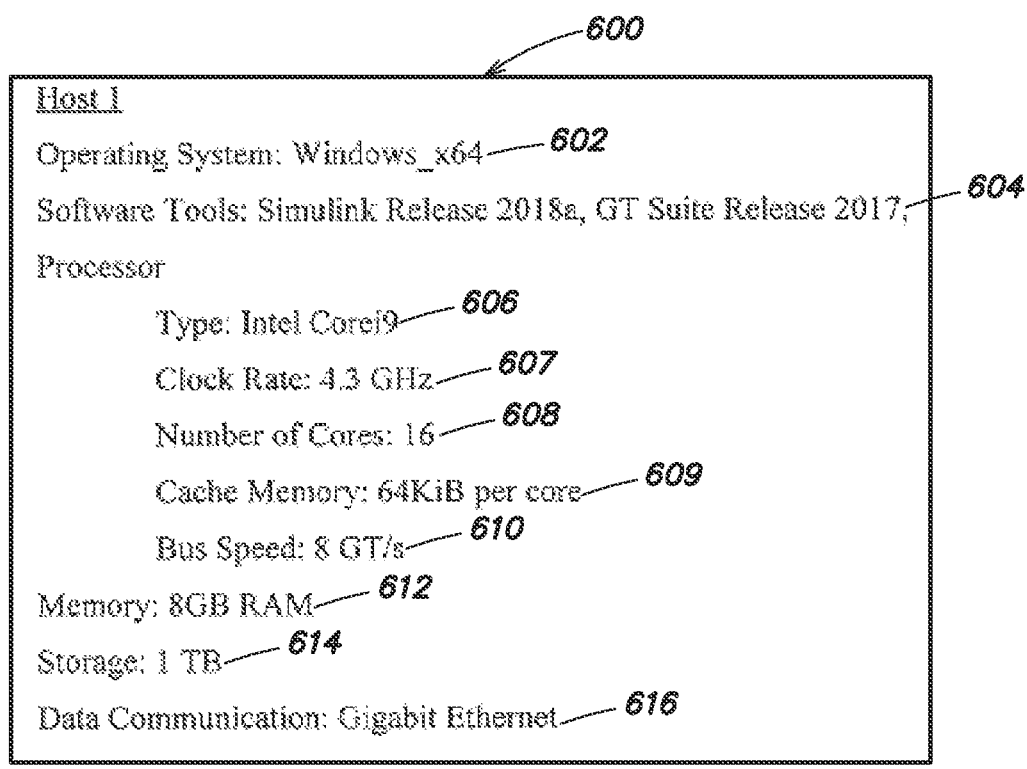
FIG. 6 is a schematic illustration of example metadata for a node of a computer network in accordance with one or more embodiments.

FIG. 6 is a schematic illustration of example metadata 600 for the node 140a of the computer network 106 in accordance with one or more embodiments. The network discovery engine 114 may access the metadata 600 and retrieve parameters for node 140a, which may be identified as 'Host 1'. The metadata 600 may include an entry 602 that indicates the Operating System (OS) of node the 140a, e.g., Windows, 64-bit. The metadata 600 may include an entry 604 that identifies the software simulation tools loaded on the node 140a by name and release, e.g., Simulink—Release 2018a, GT SUITE—Release 2017. The metadata 600 may include information on the processor resources of the node 140a. For example, the metadata 600 may include five entries 606-610 indicating the type of processor(s), e.g., Intel Corei9, the processor clock rate, e.g., 4.3 gigahertz (GHz), the number of processor cores, e.g., 16, the processor cache memory, e.g., 64 kilobinary bytes (KiB) per core, and the bus speed, e.g., 8 Gigatransfers per second (GT/s). The metadata 600 also may include an entry 612 for the node's main memory, e.g., 8 gigabytes (GB) of Random Access Memory (RAM), an entry 614 for the node's persistent storage, e.g., 1 terabyte (TB), and an entry 614 for the type of data communication link(s) used by node 140a to access the computer network 106, e.g., Gigabit Ethernet.

The network discovery engine 114 may obtain the following information for the nodes 140b and 140c of the computer network 104:

Node 140b
Host 2
OS: Linux, 64-bit
Software Tools: Simulink Release 2017b, CarMaker Release 2016,
Processor
Type: Intel i3
Clock Rate: 1.2 GHz
Number of Cores: 2
Cache Memory: 64 KiB per core
Bus Speed: 2.5 GT/s
Memory: 2 GB Persistent Storage: 500 GB
Data Communication: Fast Ethernet
Node 140c
Host 3
OS: macOS 10.13
Software Tools: Simulink Release 2018a, GT Suite Release 2017,
Processor
Type: Intel i5
Clock Rate: 1.2 GHz
Number of Cores: 4
Cache Memory: 64 KiB per core
Bus Speed: 2.5 GT/s
Memory: 4 GB
Persistent Storage: 500 GB
Data Communication: WiFi 802.11

Suitable tools that may be used to perform network discovery include server/cluster management tools and cloud services, such as Amazon Web Services from Amazon.com, Inc. of Seattle, Wash. and Microsoft Azure from Microsoft Corp. of Seattle, Wash., among others, and container-orchestrating tools, such as Docker from Docker, Inc. of San Francisco, Calif. and Kubernetes from the Cloud Native Computing Foundation.

Partitioning the High-Level System Design to Realize a Model

Selecting, Setting Up, and Solving the Objective Function

The objective function selector 122 may choose a particular objective function for partitioning the high-level system design 128 to realize a model. Suitable objective functions include cost functions, energy functions, reward functions, and utility functions. The objective function may solve a constrained optimization problem.

The objective function may be represented as:

$$\operatorname*{argmin}_{P,C,T,M} J(P, C, T, M) \text{ subject to } R(H) > 0$$

where, argmin stands for 'argument of the minimum' and is an objective function that determines the values of points P, C, T, and M for which the function J( ) attains a reduced, e.g., minimum, value, P is the partition of the high-level system design 128, C are the selected model components, T is the communication rate between two model components, M are the compensation parameters, and H are the computing resources, e.g., processor and memory resources.

The objective function J(P,C,T,M) may be a cost function derived from the user-specified objectives, e.g., a weighted sum of one or more of fidelity, execution speed, memory usage, and tolerance.

An example function is the MATLAB 'fmincon' function, which finds the minimum of a constrained nonlinear multivariable function:

[P, C, T, M]=fmincon(J, . . . )

The 'fmincon' function is described in the Optimization Toolbox User's Guide (The MathWorks, Inc. March 2018), which is hereby incorporated by reference.

The objective function set-up engine 124 may configure the objective function with one or more hard constraints. For example, the simulation tool for running a particular model component may only be compatible with a Windows operating system. A model component run by a simulation tool that works on another OS, such as Linux, cannot be included in the solution.

The fidelity, execution speed, memory usage, and tolerance may be referred to as soft constraints as the objective function seeks to minimize (or maximize) these parameters.

Furthermore, the user may specify one or more hard constraints for the objective function. For example, the user may indicate that none of the selected model components can have a particular type of model element, such as a Merge block of the Simulink® model-based design environment. In this case, the co-simulation component discovery engine 118 may analyze the available model components 302-320 to determine whether any of them include a Merge block. If so, the co-simulation component discovery engine 118 may flag such co-simulation components, and the objective function set-up engine 124 may assign high weights to or remove those flagged model components from the objective function. Similarly, a user may indicate that it only has licensing rights to run some number of instances of a given simulation tool. The objective function set-up engine 124 may parameterize the objective function such that the solution meets the licensing rights constraint received from the user.

Furthermore, a user may bind one or more elements of the high-level system design 128 to particular model components and/or simulation tools. For example, the user may indicate that the controller element is to be implemented by the model component of block 308. Alternatively or additionally, the user may indicate that the model components for the vehicle and the driver elements are to be run by a given simulation tool, such as the Simulink® model-based design environment. The user may also specify a priority for particular model components and/or simulation tools. For example, the user could indicate that the realized model should include model components run by the Simulink® model-based design environment where possible. Similarly, the user could specify an order of preferences, such as model components run by the Simulink® model-based design environment, then CarMaker, then GT-SUITE.

Alternatively or additionally, the user could specify one or more Quality of Service (QoS) objectives for the realized model. For example, the user could indicate that the communication links among model components should minimize delay, ensure lossless communication, guarantee the order, e.g., the sequence, of data, etc. The objective function set-up engine 124 may configure the objective function to realize a model that meets such objectives.

In some embodiments, a model component can declare that its interface discloses zero-crossing events. When determining how to partition the high-level system design 128, the constrained optimization processor 120 may avoid placing a partition boundary across an interface with zero-crossing events.

When a zero crossing occurs during an execution (simulation) step, the zero crossing may be handled by reducing the execution (simulation) step size so as to make a step that is close (e.g., given some tolerance in time or for variable values) to the point in time where the zero crossing occurs. If there are zero crossing functions in multiple model components, the configuring/partitioning may map these model components onto one cosimulation component so that the step size variation is contained within the one cosimulation component. Alternatively, depending on the objective function, the partitioning/configuring may determine not to use the zero crossing location for a model component to trade execution speed for efficiency.

A user may also provide information that eases one or more of the constraints. For example, one of the available model components may run on a given version, e.g., Release 2017, of a software simulation tool. The user, however, may indicate to the model partitioning engine 108 that the model component may be run by another version, e.g., Release 2018, as well. The objective function set-up engine 124 may parameterize the objective function such that the solution may provide for the model component being run by either version of the simulation tool.

Solutions

Fidelity

Suppose the objectives 130 specified by the user placed a high weight on fidelity as compared to the weights placed on execution speed and memory usage.

As described, there may be a fidelity value for each model component or at least some of them. There may also be an accuracy value resulting from the communication rates of interfaces among selected components. For example, the sample rate and/or step size of an interface may impact the accuracy of data being exchanged.

Once the objective function has been setup, it may be solved by the objective function solver 126. The solution may identify selected model components to implement the elements of the high-level system design 128, co-simulation partitions, nodes 140 of the computer network, simulation tools and versions, communication rates, and compensators.

As described, the two model components corresponding to block 302 labeled 'A' and block 304 labeled 'B' can each simulate the environment element of the high-level system design 128. Furthermore, the model component of block 302 ('A') has a fidelity value of 2, whereas the model component of block 304 ('B') has a fidelity value of 10. A solution of the objective function in which the fidelity objective is assigned a high weight is likely to result in the selection of the model component of block 304 ('B').

The two model components corresponding to block 310 labeled 'G' and block 312 labeled 'H' can each simulate the powertrain element. Suppose the model component of block 312 ('H') has a higher fidelity value than the model component of block 310 ('G'). The three model components corresponding to the block 318 labeled 'K', the block 319 labeled 'L', and the block 320 labeled 'M' can each simulate the vehicle element. Suppose, of those three, that the model component of block 318 ('K') has the highest fidelity value. The two model components corresponding to the block 314 labeled 'I' and the block 316 labeled T can each simulate the driver element. Suppose, of those two, that the model component of block 314 ('I') has the highest fidelity value. The four model components corresponding to blocks 306-309 labeled 'C', 'D', 'E', and 'F' can each simulate the controller element. Suppose, of those four, that the model component of block 308 ('E') has the highest fidelity value.

In some embodiments, one or more execution characteristics of a given model component may be changed. For example, in some cases, a model component's fidelity can be changed by changing the solver type used to run the model component. For example, differential equation solvers have tolerances (absolute and relative), step sizes (fixed or variable), maximum step sizes, minimum step sizes, error terms, polynomial orders, maximum convergence iterations, etc. All of these various different options contribute to the accuracy of a numerical approximation by a differential equation solver. Root-finding solvers have tolerances (relative, absolute), step sizes, maximum iterations for convergence, interpolation schemes, search schemes (e.g., bisection, gradient descent, combinations of schemes), etc. All of these various different options impact the time it takes to compute a solution and the memory required (e.g., a higher order solver will take more time and memory to compute a solution.)

Suppose further that the model components of blocks 304 ('B') and 312 ('H') are simulation models run by the GT SUITE simulation tool. Suppose that the model component of block 308 ('E') is a model run by the Simulink® model-based design environment. Suppose that the model components of blocks 318 ('K') and 314 ('I') are simulation models run by the CarMaker software tool.

Figure 7:
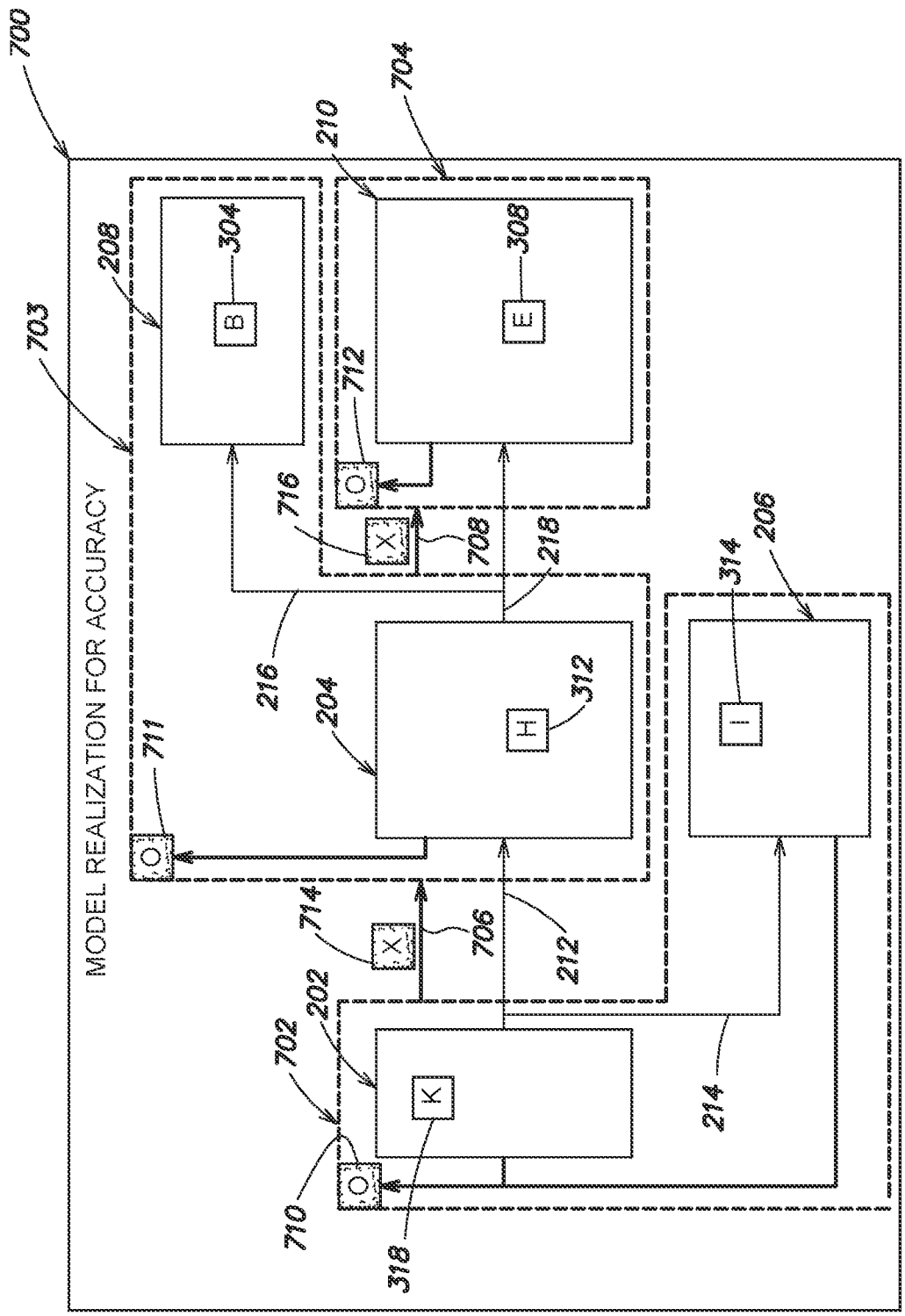
FIG. 7 is a schematic illustration of an example model in accordance with one or more embodiments.

FIG. 7 is a schematic illustration of an example model 700 automatically realized by the model partitioning engine 108 for the high-level system design 128 in accordance with one or more embodiments. The model 700, which may be referred to as a co-simulation framework, represents a solution of the objective function as computed by the objective function solver 126 with the fidelity objective being given a high weight relative to the other objectives. The solution determined by the objective function solver 126 may provide that the high-level system design 128 should be cut in two places thereby creating three co-simulation partitions 702-704. For example, the solution may provide that model components for the vehicle element and the driver element should be placed in one co-simulation partition, e.g., the partition 702, that model components for the powertrain and environment elements should be placed in another co-simulation partition, e.g., the partition 703, and that a model component for the controller should be placed in yet another co-simulation partition, e.g., the partition 704. Accordingly, the solution may provide that one cut should be made at the link 212 between vehicle and the powertrain elements, and that another cut should be made at the link 218 between the powertrain and the controller elements. Additionally, the objective function solver 126 may determine that, of the set of available model components 302-320, the model 700 should include the model components corresponding to blocks 318 ('K'), 312 ('H'), 314 ('I'), 304 ('B'), and 308 ('E') for the vehicle, powertrain, driver, environment, and controller elements, respectively.

The solution may further provide that the partition 702 should be run by one simulation tool, such as the CarMaker simulation tool, on one node, such as the node 140a, of the computer network 106. The solution may also provide that the partition 703 should be run by another simulation tool, such as the GT SUITE simulation tool, on another node, such as the node 140b, of the computer network 106. The solution may also provide that the partition 704 should be run by yet another simulation tool, such as the Simulink® model-based design environment, on a different node, such as the node 140c, of the computer network 106. Interfaces may be established at the cuts made in the high-level system design 128. For example, the solution may define one interface 706 between the partitions 702 and 703, and another interface 708 between the partitions 703 and 704.

A solution of the objective function may account for characteristics of the signals represented by the arrows 212, 214, 216, and 218. It may also account for attributes of the data communication links among the nodes 140a-c of the computer network 106. For example, suppose the signal represented by the arrow 214 is a video stream. To support the video stream, which may require a high-bandwidth data transfer, the solution may try to place the vehicle and driver elements in the same partition and/or on the same node. Suppose the signal represented by the arrow 212 represents occasionally transmitted control messages. The solution may allow the vehicle and the powertrain elements to be placed in different partitions on different nodes that are linked by a low bandwidth data communication connection.

The solution computed by the objective function solver 126 may include information for configuring the co-simulation partitions 702-704. For example, the solution may include information 710 for configuring the partition 702, other information 711 for configuring the partition 703, and still other information 712 for configuring the partition 704. The information 710-712 may identify local execution engines and/or solvers to be used by the simulation tools running in the respective partitions 702-704. The information 710-712 may indicate the step sizes to be used by the local execution engines and/or solvers, and local solver parameters, such as relative and absolute tolerance, step size, etc.

Changing one or more configuration parameters of a model component may change one or more characteristics of the model component. For example, changing the solver and/or tolerance may change the simulation fidelity of the model component. In some embodiments, the solution determined by the objective function solver 126 may include changing and/or setting one or more parameters for a model component based on a specified weighting among fidelity, execution speed, and memory usage, e.g., to achieve the specified weighting among fidelity, execution speed, and memory usage. A single model component may thus represent multiple alternatives by changing one or more of its parameters. Suppose for example a single model component is provided for an engine control element, and fidelity is assigned a higher weight relative to execution speed and memory usage. Based on this objective, the solution may determine the particular solver and tolerance parameter for the model component that models the engine control element.

With reference to the Simulink simulation environment, the objective function solver 126 may change values/settings for one or more parameters concerning: choice of solver(s), buffer reuse, diagnostic options, logging/visualization, parameter tuning, mode (Normal, Rapid Accelerator), out-of-process vs. in-process execution, optimization options, and/or register settings.

Changing the solver may improve simulation fidelity and/or execution performance, such as speed, memory usage, resource utilization, file access, etc. Exemplary available solvers may include fixed-step discrete solvers and fixed-step continuous solvers, such as Euler's Method (ode1), Heun's Method (ode2), Bogacki-Shampine Formula (ode3), Fourth-Order Runge-Kutta (RK4) Formula (ode4), Dormand-Prince (RK5) Formula (ode5), Dormand-Prince RK8(7) (ode8), and variable step solvers, such as Runge-Kutta, Dormand-Prince (4, 5) pair (ode45), Runge-Kutta (2, 3) pair of Bogacki & Shampine (ode 23), PECE Implementation of Adams-Bashforth-Moulton (ode113) and nonadaptive Runge-Kutta (odeN).

Turning signal buffer reuse off reduces memory usage, but impacts debugging capability. Turning off runtime diagnostics, such as array out-of-bound indexing checking diagnostics, can improve execution speed, but also impacts debugging capability. Turning off logging, visualization, and/or parameter tuning can improve execution speed. Selecting Rapid Accelerator mode and a shared library simulation target can increase execution speed and improve memory usage over Normal mode, but impacts interactivity and debugging. Selecting in-process execution over out-of-process execution can improve execution speed, but may provide a less robust environment in which model execution may crash the simulation environment and symbol conflicts between software applications may be unresolved. Optimization options, such as "use bitsets" may reduce memory usage, but may slow execution speed/simulation time. Register settings, such as flush to zero (FTZ) and denormals are zero (DAZ) may improve execution speed, but may be less accurate.

It should be understood that these parameters are exemplary and that the objective function solver 126 may change one or more other parameters.

The solution determined by the objective function solver 126 may further include information for configuring the interfaces between model components placed in different co-simulation partitions. For example, the solution may include information 714 for configuring the interface 706 between model components 318 and 312 in co-simulation partitions 702 and 703, and other information 716 for configuring the interface 708 between model components 312 and 308 in co-simulation partitions 703 and 704. For example, the information 714 and 716 may relate to compensators for the interfaces 706 and 708. The information 714 and 716 may include the location of and parameters for such compensators.

A compensator may be represented graphically in the model 700 (e.g., displayed in the model as a block) to show the user, or it may be virtual, such that the user does not receive an indication that a compensator is applied and/or inserted in the model 700.

Additionally or alternatively, the communication rate for the signal 212 between the model components 318 and 312 as implemented in the model 700 by the interface 706 may be automatically determined by the interface configuration engine 112. Components 318 and 312 may be referred to as co-simulation components. For example, the communication rate of the interface 706 may be set equal to the modeled sample rate of the signal 212. In some implementations, the interfacing required to communicate between subordinate solvers in a co-simulation framework may require a communication rate different from the modeled sample rate for a co-simulation component. For example, assuming the signal 218 is set to have a continuous-time modeled sample rate, the communication rate of the interface 708 cannot be set to match because the continuous-time modeled sample rate (e.g., a discrete rate based on the step size of a numerical integration scheme used to model the continuous-time) may be higher than the discrete communication rate possible for communication between co-simulation components 312 and 308. As another example, assuming the signal 218 is set to have a discrete-time modeled sample rate, the communication rate of the interface 708 may be set to be a multiple of the discrete-time modeled sample rate when the processing resources do not support a communication rate as fast as the modeled sample rate.

The interface configuration engine 112 may determine explicit compensation is appropriate when information needed to perform implicit compensation was not unavailable. Alternatively, the interface configuration engine 112 may apply explicit compensation independently of whether or not the information needed to perform implicit compensation was available. For example, the interface configuration engine 112 may be programmed to always perform explicit compensation.

A block representing compensator may be inserted in the model 700 between co-simulation components 318 and 312 to perform the explicit compensation. In some embodiments, a visual representation of a compensator (e.g., a block, a coupling element that connects blocks or other model elements, etc.) may be provided, although visual representations are not required for explicit compensation. For example, the functionality of a compensator block may be inserted into the co-simulation component 312 by changing properties of the signal connecting the co-simulation components 318 and 312 without inserting a new block. In some implementations, the arrow 212 representing the signal may be modified to visually indicate that compensation has been made and/or that the compensator functionality has been added to the signal. In some implementations, the functionality of a compensator may be inserted in an in-memory representation of the realized model, and may not be shown in the visualization of the realized model.

In some implementations, the compensator may be an algorithm applied to the signal output from the co-simulation component 318 that modifies the signal to compensate for the intermediate data points generated by co-simulation component 318 that are lost during co-simulation. The compensation to the signal modifies the signal input into the co-simulation component 312. For example, the modification to the signal may cause an integration value output from the co-simulation component 318 to be closer to an integration value that would be calculated using all the intermediate data points generated by co-simulation component 318 than if no compensation was performed.

In some implementations, a compensator also may be needed for interfaces between co-simulation components placed in the same partition. For example, a compensator may be needed for signal 214 between co-simulation components corresponding to blocks 318 and 314.

Suitable techniques for determining and locating compensators for co-simulation are described in application Ser. No. 15/612,501, filed Jun. 2, 2017 for Systems and Methods for Co-Simulation by Tao Cheng et al., U.S. Pat. Publ. No. 2018/0349539, which application is hereby incorporated by reference in its entirety.

Staged Partitioning

In some embodiments, the objective function solver 126 may solve the partitioning problem in stages, and the results of one or more of these stages may be presented to the user, e.g., for approval and/or adjustment. If the user approves the present stage, the objective function solver 126 may proceed to the next stage of the partitioning problem.

Figure 13:
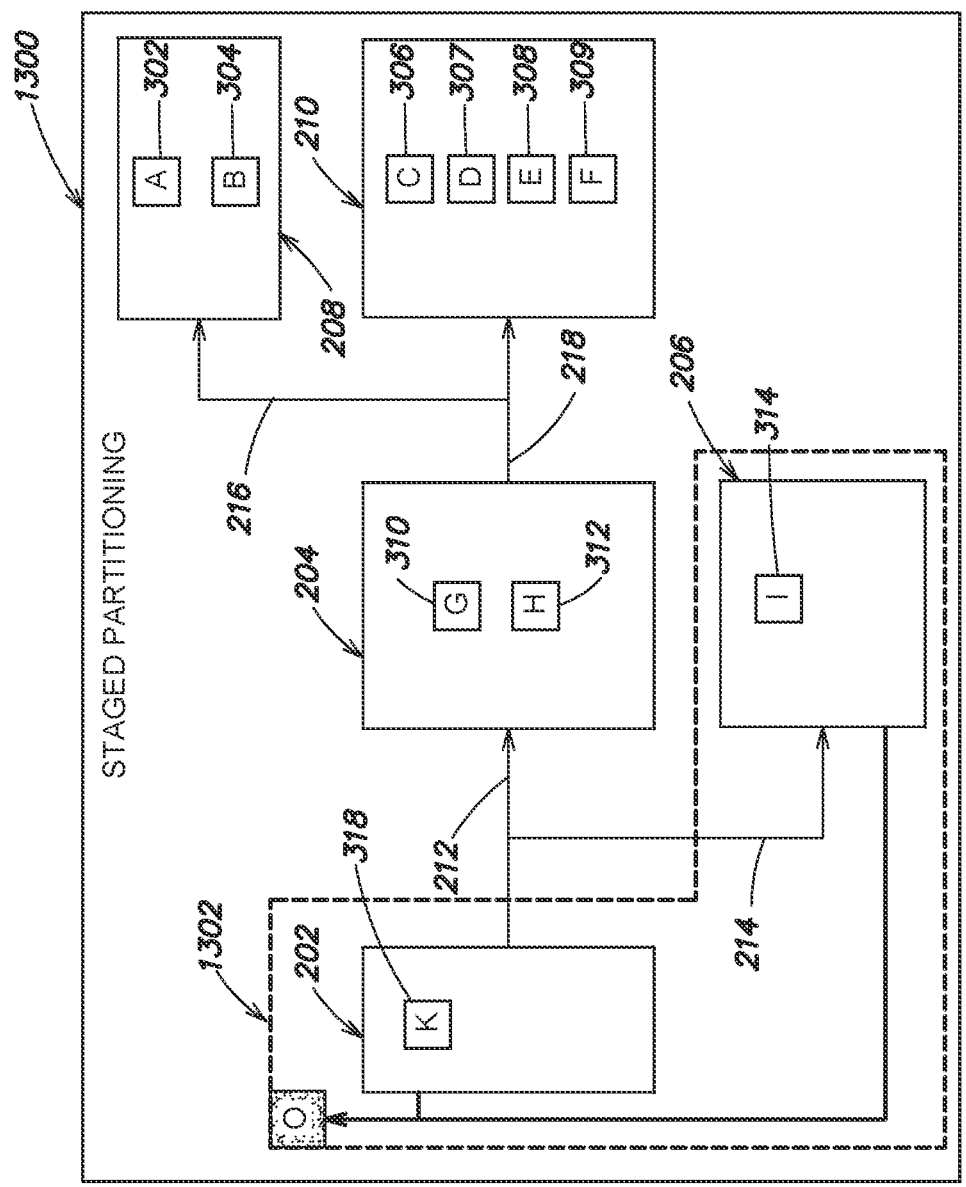
FIG. 13 is a schematic illustration of an example partitioning stage in accordance with one or more embodiments.

FIG. 13 is a schematic illustration of an example stage 1300 of a partitioning process for the high-level system design 128 in accordance with one or more embodiments. The partitioning stage 1300 represents a partial solution of the objective function as computed by the objective function solver 126. The partitioning stage 1300 may provide that the vehicle element 202 be implemented by the model component corresponding to block 318 ('K') and that the driver element 206 be implemented by the model component corresponding to block 314 ('I'). The partitioning stage 1300 may further provide that the model components of blocks 318 ('K') and 314 ('I') should be placed in one partition, e.g., the partition 1302. The partial solution may further provide that the partition 1302 should be run by one simulation tool, such as a Synopsys simulation tool, on one node, such as the node 140a, of the computer network 106. The partitioning stage 1300 may not, however, have selected model components for the powertrain element 204, the vehicle environment element 208, or the control element 210. The partitioning stage 1300 also may not have determined the partitioning for the powertrain element 204, the vehicle environment element 208, or the control element 210.

Assuming a user accepts the selection of model components of blocks 318 ('K') and 314 ('I'), and their placement in a co-simulation partition, the user may lock this selection. For example, a graphical affordance may be presented, e.g., by selecting the co-simulation partition 1302, through which the user may lock the partition 1302. The objective function solver 126 may then resume solving the partitioning problem. For example, the objective function solver 126 may generate an objective function that includes blocks 318 ('K') 314 ('I') as hard constraints, and only solves for the powertrain element 204, the vehicle environment element 208, and the control element 210.

In some embodiments, a user may freeze a partial solution for the powertrain element 204, the vehicle environment element 208, and the control element 210, and evaluate one or more solutions determined for the vehicle element 202 and the driver element 206.

The utilization of staged partitioning may improve user experience and interaction with the simulation environment.

Model Realization Assessment

The realized model 700 may be executed simulating, for example, the behavior of the high-level system design 128, and producing co-simulation results. The selected model components 146-149 may be run by different execution engines, different solvers, and/or different simulation tools in a co-simulation manner. The integration platform 102 may interface with the different simulation tools to execute functionalities for the selected model components 146-149 to execute the realized model 700 in a co-simulation manner. Alternatively, the integration platform 102 can implement one simulation tool, and run the components of the realized model 700 using different execution engines and/or solvers within the same simulation tool.

The assessment engine 113 may be used to determine whether the objectives 130 are met by the realized model 700. For example, having specified fidelity as the highest weight objective, the assessment engine 113 may evaluate the accuracy of the co-simulation results produced by the realized model 700. The assessment engine 113 may determine that the co-simulation results accurately model results that would be expected from a real world system that is represented by the high-level system design 128. Validation techniques may be applied. For example, an overall model may be executed with no cosimulation configuration and using the most accurate solver available to obtain baseline results. Then, the baseline results may be compared to the result of a cosimulation simulation to determine accuracy. Another assessment may be to check whether instability occurs (e.g., indicated by excessive values in a simulation). Another method to obtain the baseline may use a high communication rate and then compare this baseline with the cosimulation configured according to the user objective function. Alternatively, cosimulation configurations may be produced, and their output compared. If this comparison shows large (e.g., larger than a tolerance) differences then one or both of the cosimulation configurations may be rejected. In other embodiments, a user may make an expert assessment of the accuracy of the simulation results. Other assessments may involve any of the parameters discussed herein, such as whether the model executes within a certain time duration, whether it fits in memory, whether the communication rates are met, etc.

In some embodiments, the assessment engine 113 may detect over constraints. For example, the results produced by the realized model 142 may match the results expected from the high-level system design 128 to a high degree of accuracy, however, it may take much longer to execute the realized model 142 than anticipated by the user. In this case, the user may relax the fidelity objective and increase the execution speed objective, and direct the model partitioning engine 108 to create a new partition of the high-level system design 128.

Execution Speed

As described, the model 700 is a realization of the high-level system design 128 in which the fidelity objective is given a high weight relative to the other objectives. It should be understood that the model partitioning engine 108 may automatically create a different realization of the high-level system design 128 when a different objective, such as execution speed, is given a high weight. For example, the objective function set-up engine 124 may set up the objective function so that the solution minimizes execution time. The objective function solver 126 may then solve this new objective function to realize a different model.

Suppose, for the two model components corresponding to block 302 labeled 'A' and block 304 labeled 'B' that simulate the environment element of the high-level system design 128, that the co-simulation component of block 302 ('A') has a higher execution speed value. Accordingly, a solution of the objective function in which the execution speed objective is assigned a high weight is likely to result in the selection of the co-simulation component of block 302 ('A'). Suppose further, for the two co-simulation components corresponding to block 310 labeled 'G' and block 312 labeled 'H' that simulate the powertrain element that the co-simulation component of block 310 ('G') has a higher execution speed value. Suppose for the three co-simulation components corresponding to the block 318 labeled 'K', the block 319 labeled 'L', and the block 320 labeled 'M' that simulate the vehicle element that the co-simulation component of block 319 ('L') has the highest execution speed value. Suppose for the two co-simulation components corresponding to the block 314 labeled 'I' and the block 316 labeled 'J' that simulate the driver element that the co-simulation component of block 316 ('I') has the highest execution speed value. Suppose for the four co-simulation components corresponding to blocks 306-309 labeled 'C', 'D', 'E', and 'F' that simulate the controller element that the co-simulation component of block 307 ('D') has the highest execution speed value.

Suppose further that the co-simulation components of blocks 302 ('A') and 310 ('G') are simulation models run by the Simulink® model-based design environment. Suppose that the co-simulation component of block 319 ('L') is a model run by the ANSYS simulation tool, that the co-simulation component of block 316 ('J') is a model run by the CarMaker simulation tool, and that the co-simulation component of block 307 ('D') is a model run by the Siemens PLM simulation tool.

Figure 8:
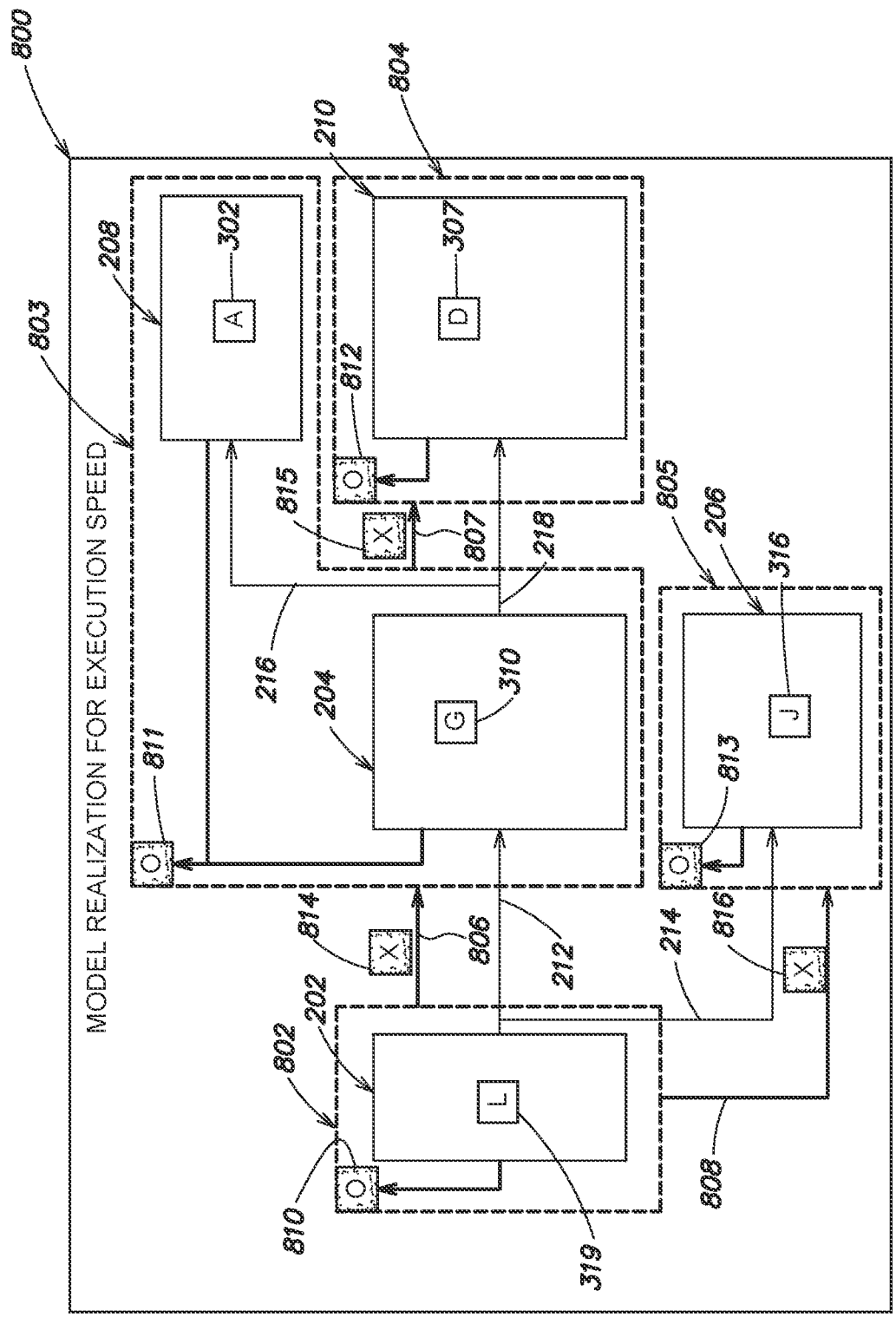
FIG. 8 is a schematic illustration of another example model in accordance with one or more embodiments.

FIG. 8 is a schematic illustration of an example model 800 automatically realized by the model partitioning engine 108 for the high-level system design 128 in accordance with one or more embodiments. The model 800 represents a solution of the objective function as computed by the objective function solver 126 with the execution speed objective being given a high weight relative to the other objectives. Here, the solution may provide that the high-level system design 128 should be cut in three places thereby creating four partitions 802-805. For example, the solution may provide that a model component for the vehicle element should be placed in one co-simulation partition, e.g., the co-simulation partition 702, that model components for the powertrain and environment elements should be placed in another co-simulation partition, e.g., the co-simulation partition 803, that a model component for the controller should be placed in yet another co-simulation partition, e.g., the co-simulation partition 804, and that a model component for the driver element should be placed in a still further co-simulation partition, e.g., the co-simulation partition 805. Accordingly, the solution may provide that one cut should be made at the link 212 between vehicle and the powertrain elements, that another cut should be made at the link 218 between the powertrain and the controller elements, and a further cut should be made at the link 214 between the vehicle and the driver elements. Additionally, the objective function solver 126 may determine that, of the set 104 of available model components, the model 800 should include the model components corresponding to blocks 319 ('L'), 310 ('G'), 316 ('J'), 302 ('A'), and 307 ('D') for the vehicle, powertrain, driver, environment, and controller elements, respectively.

The solution may further provide that the co-simulation partition 802 should be run by one simulation tool, such as the ANSYS simulation tool, on one node, such as the node 140a, that the co-simulation partition 803 should be run by another simulation tool, such as the Simulink® model-based design environment, on another node, such as the node 140b, that the co-simulation partition 804 should be run by yet another simulation tool, such as the Siemens PLM simulation tool, on a different node, such as the node 140c, and that the co-simulation partition 805 should be run by a still further simulation tool, such as the CarMaker simulation tool, on yet another node.

Interfaces may be established at the cuts made in the high-level system design 128. For example, the solution may define one interface 806 between the co-simulation partitions 802 and 803, another interface 807 between the co-simulation partitions 803 and 804, and a further interface 808 between the co-simulation partitions 802 and 805.

The solution computed by the objective function solver 126 may include information for configuring the co-simulation partitions 802-805. For example, the solution may include information 810 for configuring the co-simulation partition 802, other information 811 for configuring the co-simulation partition 803, still other information 812 for configuring the co-simulation partition 804, and further information 813 for configuring the co-simulation partition 805. The information 810-813 may identify local solvers to be used by the simulation tools running in the respective co-simulation partitions 802-805.

The solution determined by the objective function solver 126 may further include information for configuring the interfaces between model components placed in different co-simulation partitions. Such model components may be referred to as co-simulation components. For example, the solution may include information 814 for configuring the interface 806 between co-simulation components 319 and 310 in co-simulation partitions 802 and 803, other information 815 for configuring the interface 807 between co-simulation components 310 and 307 in co-simulation partitions 803 and 804, and further information 816 for configuring the interface 808 between co-simulation components 319 and 316 in co-simulation partitions 802 and 805. For example, the information 814-816 may relate to compensators for the interfaces 806-808. The information 814-816 may include the location of and parameters for such compensators.

The realized model 800 may be executed producing co-simulation results. Like the model 700, the model 800, when executed, may simulate the behavior of the high-level system design 128. The integration platform 102 may interface with the different simulation tools to execute functionalities for the selected co-simulation components to execute the realized model 800 in a co-simulation manner.

The assessment engine 113 may be used to determine whether the objectives 130 are met by the realized model 800. For example, having specified the execution speed objective to be higher than the other objectives, the assessment engine 113 may evaluate how long it takes to run the realized model 800. Suppose the user determines that the model 800 takes much less time to run than user anticipated, but that the fidelity of the realized model 800 is lower than anticipated. In this case, the user could change the objectives, e.g., lower the weight for execution speed and increase the weight for fidelity, and direct the model partitioning engine 108 to compute a new partition for the high-level system design 128.

For other objectives, such as HDL code generation, the model partitioning engine 108 may generate a different realized model. In this case, the model partitioning engine 108 may place a high weight on those co-simulation components that support code generation. Generally, generating code may improve execution speed. However, it may take longer for a simulation to start because of the time required to generate the code and compile it. So, if more weight is placed on the use of code generation, the configuration may include more implementations of model components that support code generation (even if their fidelity may be less, given the weighted preference by the user). Also, the partitioning may change by grouping model components that support code generation for the same target. For example, model components that support HDL code generation (with some of their implementations) may be grouped into one cosimulation component that then supports HDL code generation (and likewise for C code generation). Also, code generation generally can be configured to be more efficient in terms of execution time (also latency and throughput), size (memory use, logic gate use, stack use, etc.), and power. These parameters may be part of the objective function for the cosimulation partitioning/configuration.

Placing a higher weight on execution speed may result in a realized simulation model that requires less processor resources to execute, e.g., having improved simulation efficiency, as compared to realized models where other objectives instead of execution speed are given higher weights. In addition, placing higher weight on memory usage may result in a realized simulation model that may be stored in less computer memory of a data processing device, thus reducing the memory requirements of the data processing device, as compared to realized models where other objectives instead of memory usage are given higher weights. Placing a higher weight on simulation fidelity, e.g., numerical accuracy, may result in a realized simulation model that produces more accurate simulation results than realized models where other objectives instead of simulation fidelity are given higher weights.

Real-Time Implementations

In some embodiments, the model partitioning engine 108 may partition a high-level system design such that some, and preferably all, of the selected model components run in a real-time environment. For example, the computer network 106 may include nodes running middleware and/or operating systems that support real-time operation. The model partitioning engine 108 may create a partition that includes selected model components configured to interoperate with the real-time middleware. Exemplary middleware that support real-time operation includes the Robot Operating System (ROS) and the Data Distribution Service for real-time systems (DDS) standard from the Object Management Group (OMG). The co-simulation component loading engine 110 may create one or more data structures to utilize the middleware, such as a dictionary of the messages shared by the ROS-compatible nodes running the selected co-simulation components.

HIL/SIL/PIL

A realized model may also be used in HIL, SIL, and/or PIL testing. For example, code may be generated for a realized model, and the generated code may be deployed onto hardware resources, such as a hardware test platform, that may be coupled to a data processing device, such as a workstation. The generated code may be executed and results of the execution provided to the workstation, for example for evaluation by a user. The use of SIL, HIL, or PIL for a particular cosimulation component may be part of the configuring/partitioning. For example, model components that support SIL, HIL, or PIL could be grouped together into one cosimulation component that executes in SIL, HIL, or PIL mode in a similar manner as described with C and HDL code generation.

Integration Platform

Figure 9:
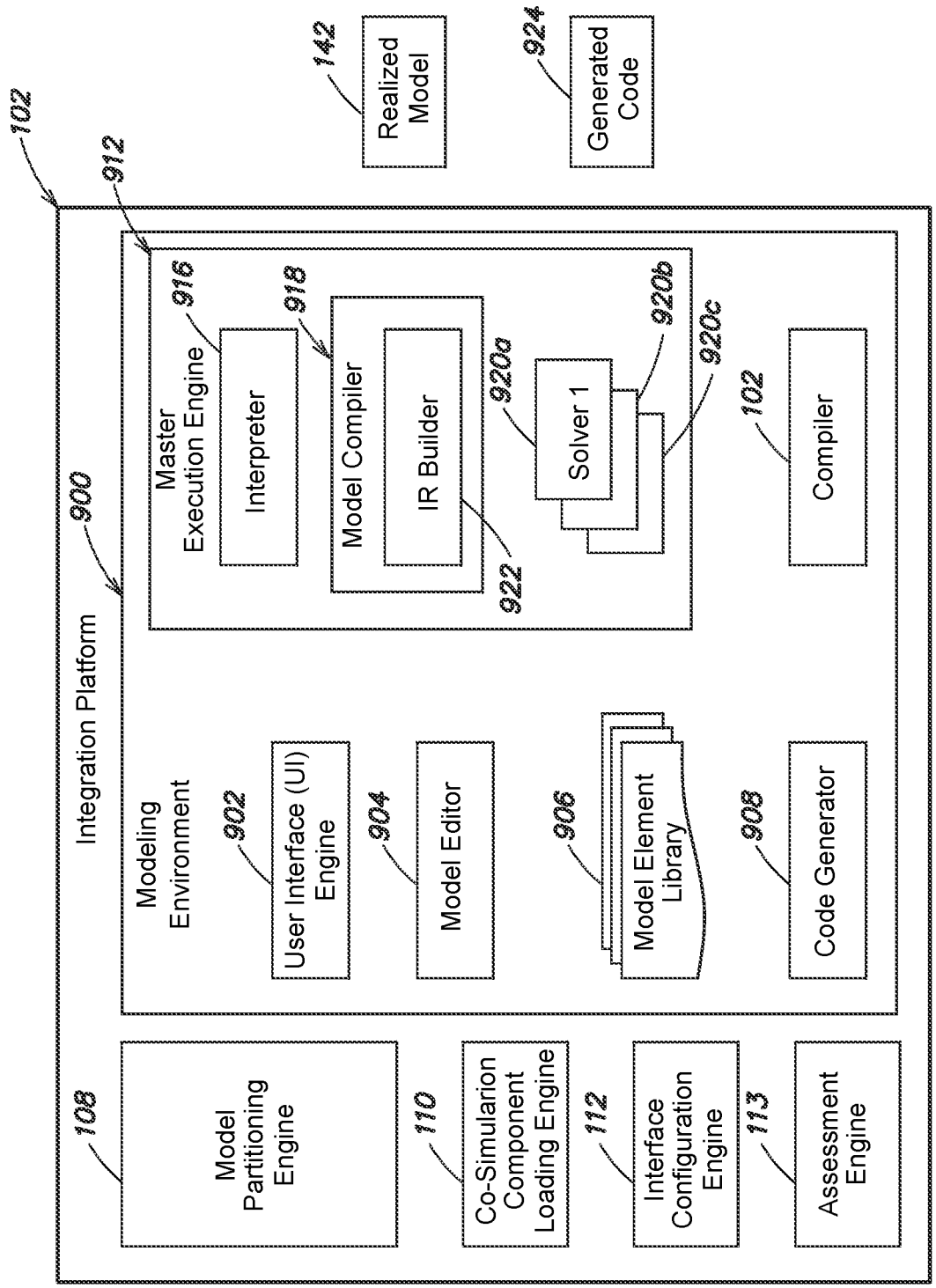
FIG. 9 is a partial, schematic illustration of an example integration platform in accordance with one or more embodiments.

FIG. 9 is a partial, schematic illustration of an example integration platform, such as the integration platform 102, in accordance with one or more embodiments. The integration platform 102 may include the model partitioning engine 108, the co-simulation component loading engine 110, the interface configuration engine 112, and the assessment engine 113. The integration platform 102 may also include a simulation environment 900. The simulation environment 900 may include a User Interface (UI) engine 902, a model editor 904, a model element library 906, a code generator 908, a compiler 910, and a master execution engine 912. The UI engine 902 may create and present one or more User Interfaces (UIs), such as Graphical User Interfaces (GUIs) and/or Command Line Interfaces (CLIs), on the display of a workstation, laptop, tablet, or other data processing device. The GUIs and CLIs may provide a user interface to the integration platform 102 and/or the simulation environment 900. The model element library 906 may contain a plurality of model element types, at least some of which may come preloaded with the simulation environment 900 and some may be custom created and saved in the library 906, e.g., by a user. A user may select model elements types from the library to add instances of the selected model element types to a model and/or a high-level system design being created and/or edited. The model editor 904 may perform selected operations on a model, such as open, create, edit, and save, in response to user inputs or programmatically.

The master execution engine 912 may include an interpreter 916, a model compiler 918, and one or more master solvers, such as solvers 920*a-c*. Exemplary solvers include one or more fixed-step continuous time solvers, which may utilize numerical integration techniques, and one or more variable-step solvers, which may for example be based on the Runge-Kutta and Dormand-Prince pair. With a fixed-step solver, the step size remains constant throughout simulation of the model. With a variable-step solver, the step size can vary from step to step, for example to meet error tolerances. A non-exhaustive description of suitable solvers may be found in the *Simulink User's Guide* from The MathWorks, Inc. (March 2018 ed.)

The model compiler 918 may include one or more Intermediate Representation (IR) builders, such as IR builder 922. In some implementations, one or more IR builders may be included or associated with the solvers 920. One or more of the IRs constructed by the IR builder 922 may be used by the interpreter 916 to perform a simulation or be used by the code generator 908 to generate code, such as generated code 924.

The integration platform 102 may automatically realize a model, such as the realized model 142, for a high-level system design, such as the design 128. As described, the realized model 142 may be a computer-based, executable model, such as a graphical model. The master execution engine 912 may execute and/or manage the execution of the realized model 142 in a co-simulation manner.

The code generator 908 may generate code, such as the generated code 924, for all or part of the realized model 142. For example, the UI engine 902 may provide or support a Code Generation button in a GUI that may be selected by the user, or the UI engine 902 may receive a code generation command entered by the user, e.g., in the GUI or the CLI. The code generation command also may be invoked programmatically, for example, when a particular event occurs. In response to the code generation command being activated, the code generator 908 may generate the code 924, for the realized model 142 or a portion thereof. The behavior of the generated code 924 may be functionally equivalent to the behavior of the realized model 142 or portion thereof. Exemplary code generators include, but are not limited to, the Simulink Coder, the Embedded Coder, and the Simulink HDL Coder products from The MathWorks, Inc. of Natick, Mass., and the TargetLink product from dSpace GmbH of Paderborn Germany.

The generated code 924 may be textual code, such as textual source code, that may be compiled, for example by the compiler 910, and executed on a target machine or device, which may not include a simulation environment and/or a model execution engine. The generated code 924 may conform to one or more programming languages, such as Ada, Basic, C, C++, C#, SystemC, FORTRAN, VHDL, Verilog, a vendor or target specific HDL code, such as Xilinx FPGA libraries, assembly code, etc. The generated code 924 may include header, main, make, and other source files. The compiler 910 may compile the generated code for execution by target hardware, such as a microprocessor, a Digital Signal Processor (DSP), Central Processing Unit (CPU), etc. In some embodiments, the generated code 924 may be accessed by a hardware synthesis tool chain, which may configure a programmable hardware device, such as a Field Programmable Gate Array (FPGA), a System on a Chip (SoC), etc., from the generated code 924. The realized model 142 and the generated code 924 may be stored in memory, e.g., persistent memory, such as a hard drive or flash memory, of a data processing device. The simulation environment 900 may be loaded into and run from the main memory of a data processing device.

In some implementations, the code generator 908 and/or the compiler 910 may be separate from the simulation environment 900, for example one or both of them may be separate application programs. The code generator 908 and/or the compiler 910 may also be run on different data processing devices than the data processing device running the simulation environment 900. In such embodiments, the code generator 908 may access the realized model 142, e.g., from memory, and generate the generated code 924 without interacting with the simulation environment 900.

Flow Diagrams

FIGS. 10A-D are partial views of a flow diagram of an example method in accordance with one or more embodiments. The flow diagram of FIGS. 10A-D is intended for illustrative purposes only. In some embodiments, one or more steps may be omitted, additional steps may be added, the order of steps may be changed, and/or one or more sequences as indicated by the arrows of FIGS. 10A-D may be omitted.

The integration platform 102 may access the high-level system design 128, as indicated at step 1002. The integration platform may access one or more objectives for partitioning the high-level system design 128 to realize a model of the high-level system design 128, as indicated at step 1004. The integration platform 102 may access one or more constraints on the partitioning, as indicated at step 1006. In some embodiments, the one or more constraints may be user-specified. The model partitioning engine 108 may analyze available co-simulation components and/or information describing available model components, to identify model components that can simulate the different elements of the high-level system design 128, as indicated at step 1008. The model partitioning engine 108 may perform discovery on one or more computer networks, such as the network 106, to identify available hardware, software, and communication resources for running the identified co-simulation components, as indicated at step 1010.

The model partitioning engine 108 may consider various arrangements of the model components, and determine whether errors may arise if certain pairs of model components were to be interconnected across co-simulation partitions, as indicated at step 1012. For example, a master execution engine 912 may analyze a connection (e.g., a signal) between two possible model components to determine connection properties for the connection. The connection properties may include a time domain of the connection (e.g., a continuous-time connection, a discrete-time signal, etc.). The master execution engine 912 may determine the modeled sample rate for the connection, which may be a continuous-time or a discrete-time connection, e.g., based on the connection parameter obtained by analyzing the connection. The master execution engine 912 may determine a communication rate for the connection. For example, the master execution engine 912 may determine that data is exchanged at a discrete-time rate along the connection based on the model component property indicating a discrete-time sample rate of a model component that outputs data via the connection.

The master execution engine 912 may determine that the modeled sample rate is different than the communication rate for the connection. For example, the master execution engine 912 may identify the signal as a discrete-continues sample time connection. Alternatively, the master execution engine 912 may identify the connection has a modeled sample rate that is different than the communication rate based on the modeled sample rate being a different discrete-time rate than the communication rate.

Figure 10A:
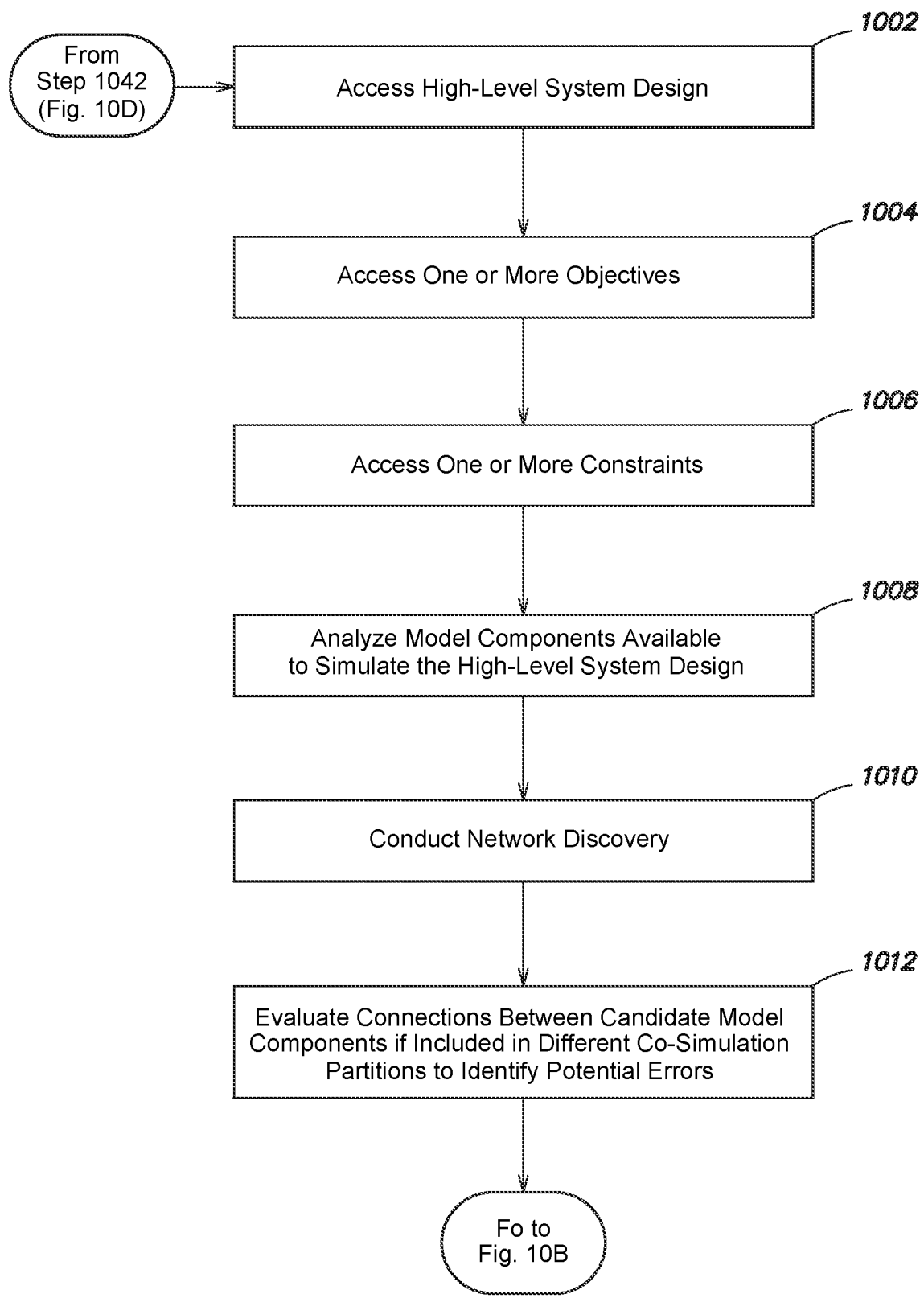
FIGS. 10A-D are partial views of a flow diagram of an example method in accordance with one or more embodiments.
Figure 10B:
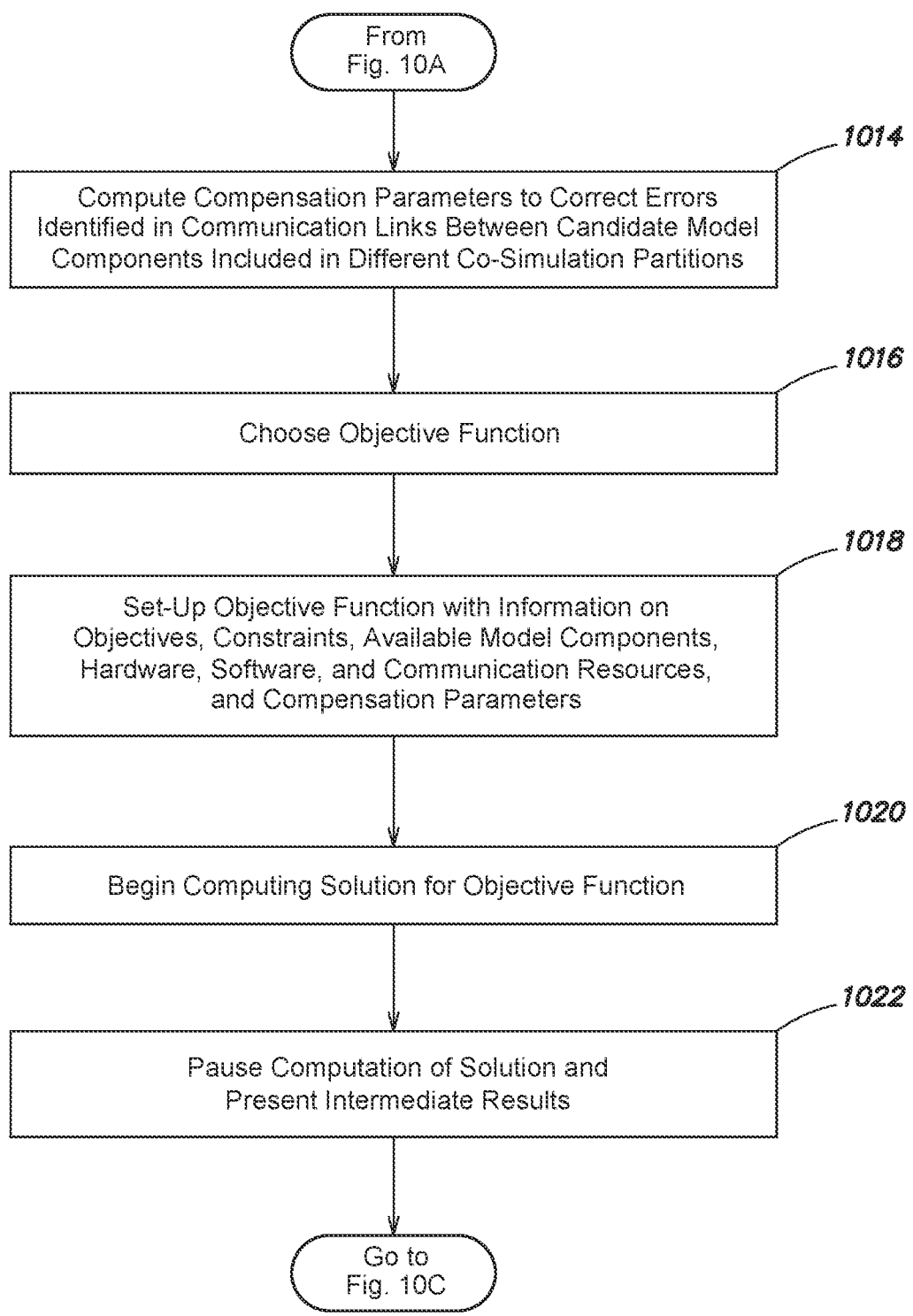

The model partitioning engine 108 may compute compensation parameters that resolve errors that may arise if certain pairs of the model components were to be included in the realized model and interconnected across co-simulation partitions, as indicated at step 1014 (FIG. 10B). The master execution engine 912 may determine whether an error is introduced into execution of a model that includes the model components being evaluated. The determination may be based on the data being communicated via the connection at the discrete-time rate and based on the connection having a different modeled sample rate. For example, master execution engine 912 may determine that an error is introduced based on a discrete-continuous sample time connection being identified.

A determination may be made whether access to computational operations of one or both of the model components being evaluated is available. For example, the master execution engine 912 may determine whether it has access to information regarding internal computational operations of one or both of the model components based on whether interfaces for the model components make the information available. If so, the master execution engine 912 may obtain information relating to the computational operations applied by one or both of the model components via their interfaces.

The model partitioning engine 108 may choose an objective function for solving for a partition of the high-level system model 128, as indicated at step 1016. It should be understood that this step is optional. For example, the model partitioning engine 108 may implement a single objective function. The model partitioning engine 108 may set-up the objective function with information on the one or more objectives, the one or more constraints, the identified model components, the hardware, software, and communication resources of the network, and the compensation parameters, as indicated at step 1018. The model partitioning engine 108 may compute a solution for the objective function, as indicated at step 1020. The solution of the objective function may include selected model components, e.g., components 146-149, co-simulation partitions among the selected model components, designations of hardware, software, and communication resources, e.g., selections 150 and 152, for running the selected model components, model settings, e.g., the model settings 154, and compensators, e.g., the compensators 155, for resolving errors across co-simulation partitions during execution of the model in a co-simulation manner.

Figure 10C:
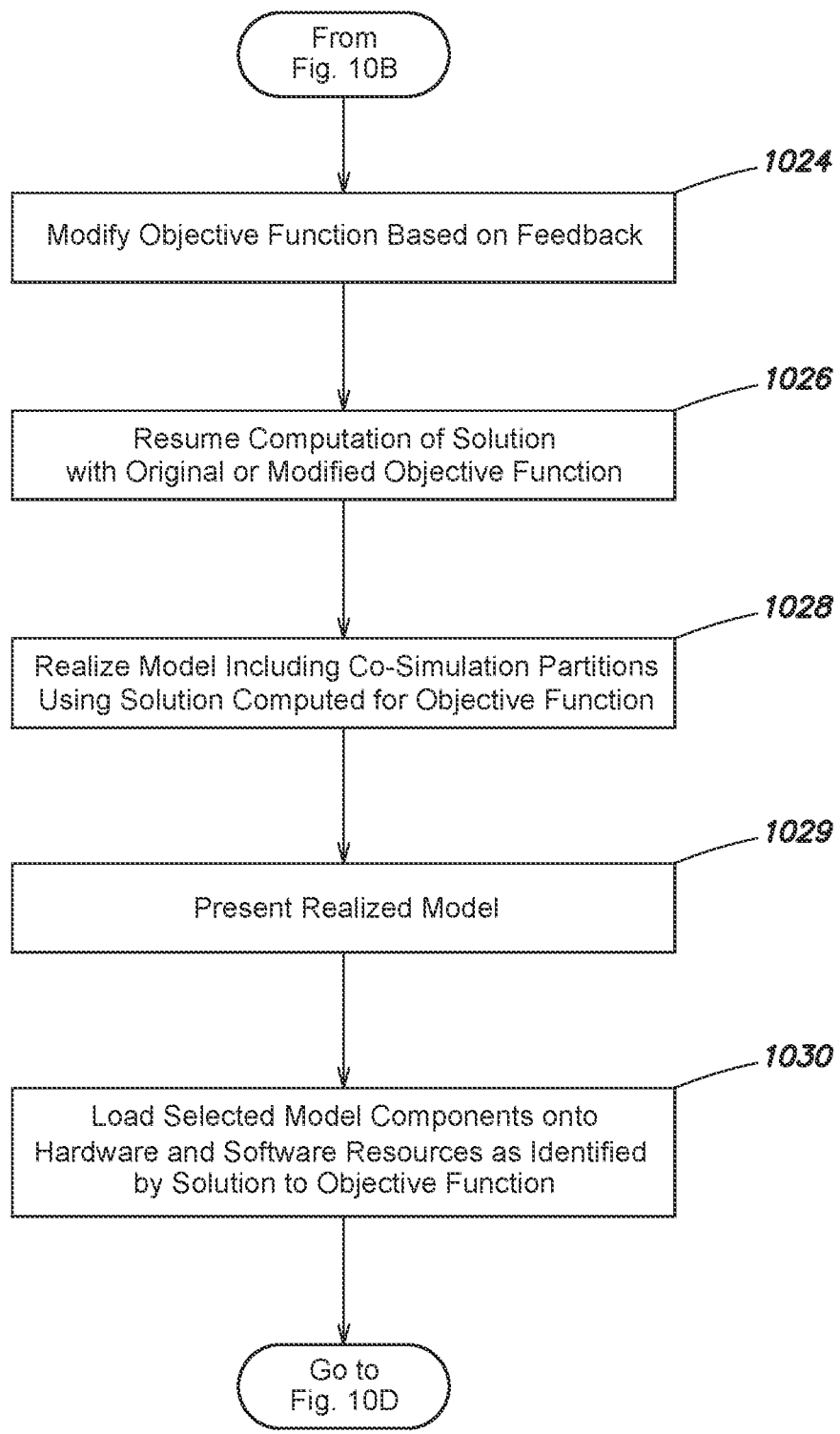

In some embodiments, the model partitioning engine 108 may pause the computation of the solution one or more times, and present an intermediate solution, e.g., to a user, as indicated at step 1022. The model partitioning engine may revise the objective function based on received information, e.g., from the user, as indicated at step 1024 (FIG. 10C). The model partitioning engine 108 may resume computation using the original objective function, if no information was received, or with a revised objective function, as indicated at step 1026.

The model partitioning engine 108 may utilize the solution to realize a model, such as the model 142, for the high-level system design 128, as indicated at step 1028. The realized model 142 may include the selected model components, co-simulation partitions, and compensators for resolving errors during execution of the model in a co-w simulation manner. The realized model may be presented, e.g., in a model editor window generated by the UI engine 902, as indicated at step 1029. The co-simulation component loading engine 110 may load the selected model components onto the hardware resources of the network 106 identified in the solution to the objective function, as indicated at step 1030.

Figure 10D:
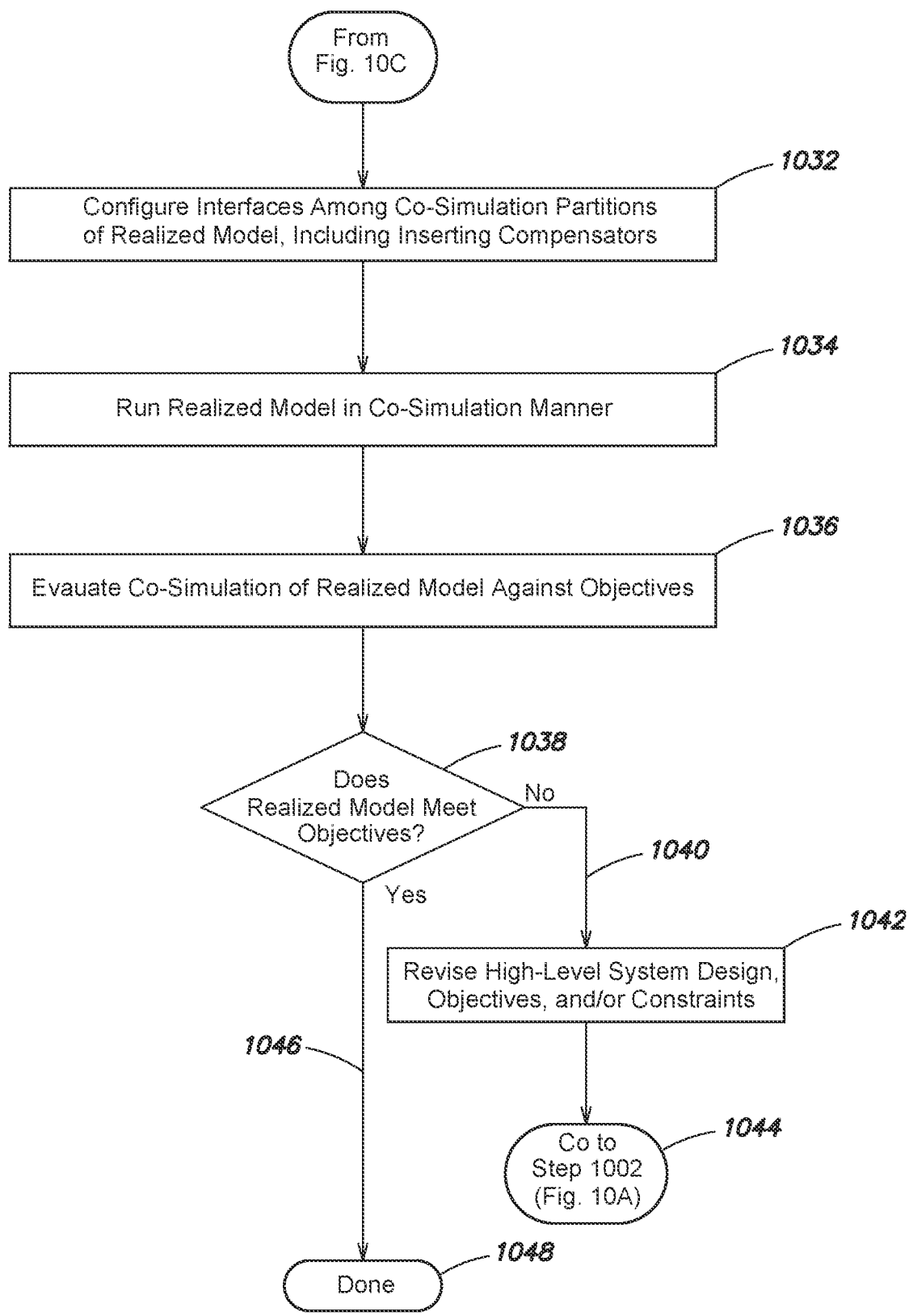

The interface configuration engine 112 may insert compensators identified in the solution to the objective function at interfaces among the co-simulation partitions, as indicated at step 1032 (FIG. 10D). In some implementations, the interface configuration engine 112 may automatically select a type of compensator to generate, and generate the compensator based on model information, the error, and/or the type of compensator. Additionally, or alternatively, the interface configuration engine 112 may present (e.g., display) information indicating the automatically determined compensation location to a user, provide the user with information identifying different types of compensators to choose from and/or receive a user defined compensator via user input, and select a compensator to use based on user input.

The interface configuration engine 112 may determine a location for a compensator, such as between the two co-simulation components being evaluated (e.g., explicit compensation). In some implementations, explicit compensation may be determined if information relating to the computational operations of a destination co-simulation component (e.g., a co-simulation component that receives the data via the connection from another co-simulation component) is not available. If a compensation location is determined to be inside a co-simulation component, the interface configuration engine 112 may further include creating a callback function (e.g., a compensation callback function) that allows a master execution engine to insert a compensator inside a co-simulation component. And, from this, the information (potentially including a flag that identifies there is a callback function to be used) for the co-simulation component may then be shared (e.g., as an XML representation/file) with another device. The interface configuration engine 112 may determine a need for the compensation callback function based on inherent compensation being determined.

The interface configuration engine 112 may insert a compensator in the realized model via the callback. For example, the interface configuration engine 112 may insert the compensator inside a co-simulation component by including the compensator in the callback function when the callback function is called.

The integration platform 102 may run the realized model in a co-simulation manner, as indicated at step 1034. During execution, the integration platform 102 may dynamically update a step size of a communication rate along a discrete-continuous sample rate connection. For example, the integration platform 102 may execute a realized model that includes co-simulation components connected via a connection. In some implementations, the connection may be a discrete-continuous sample rate connection and the model may communicate data from the first co-simulation component to the second co-simulation component via the connection at communication steps having a step size. At each communication time step, a compensation is applied by a compensator that compensates for an error occurred during execution of the model in connection with executing the model in a co-simulation manner.

The integration platform 102 may dynamically monitor an error that occurs during execution of the realized model. The error monitored may include the error occurred during execution of the model in connection with executing the model in a co-simulation manner (e.g., the error introduced into execution of the realized model based on the data being communicated via the connection at the discrete-time rate and based on the connection being declared as the continuous-time connection or a different discrete-time rate). Additionally, or alternatively, the error may be an accumulated error that remains after the compensation has been applied and that accumulates over execution phases.

The integration platform 102 may dynamically perform a sensitivity analysis of a co-simulation component. A sensitivity analysis may determine how uncertainty in an output of a co-simulation component can be attributed to uncertainty in the input of the co-simulation component. When performing the sensitivity analysis, the integration platform 102 may determine how much a change to an input of a co-simulation component impacts the output of the co-simulation component. Based on the sensitivity analysis, a dynamic sensitivity of the connection may be determined over time based on how sensitive the co-simulation components are that are connected by the connection.

The master execution engine 912 may dynamically update a step size of a communication rate along a connection between co-simulation components. The master execution engine 912 may update a step size of the communication rate of data along the connection in the model based on the sensitivity analysis and/or the error. In some implementations, as the sensitivity of the connection increases over time, the step size of the communication rate may be reduced to reduce the possibility of error or inaccuracy in the simulation. On the other hand, as the sensitivity of the connection decreases over time, the step size of the communication rate may be increased to reduce processing resources required for executing the model. Additionally, or alternatively, as the monitored error increases over time, the step size of the communication rate may be reduced to reduce the error. On the other hand, as the monitored error decreases over time, the step size of the communication rate may be increased to reduce processing resources required for executing the model.

Additionally, or alternatively, the master execution engine 912 may set a threshold sensitivity for a connection. If the sensitivity analysis indicates the sensitivity of the connection meets or exceeds the threshold sensitivity, the master execution engine may reduce (or increase) the step size of the communication rate. Likewise, if the monitored error meets or exceeds a threshold error, the master execution engine 912 may reduce (or increase) the step size of the communication rate.

Additionally, or alternatively, the step size of the communication rate may be iteratively adjusted. For example, the step size for the communication rate may be iteratively increased or decreased until a desired sensitivity (e.g., a minimum sensitivity) and/or a threshold sensitivity for the connection is achieved. In some implementations, the step size of the communication rate may be determined based on the sensitivity analysis of a previous step size sensitivity analysis.

The assessment engine 113 may evaluate the realized model's execution, e.g., in terms of the objectives 130, as indicated at step 1036. A determination may be made whether the realized model meets the objectives 130, as indicated at decision step 1038. The determination may involve user input. For example, a user may determine whether the objectives are satisfied. If not, modifications may be made to the high-level system design 128, new or revised objectives may be specified, and/or new or revised constraints may be set, as indicated at No arrow 1040 leading to step 1042. Processing may then return to step 1002, and a new solution and new realized model may be automatically generated, as indicated by Go To step 1044.

If the realized model meets the objectives, e.g., to the user's satisfaction, then processing may be complete, as indicated by Yes arrow 1046 leading to Done step 1048.

As noted, the present disclosure may be used with other high-level system designs and functional models besides the high-level system design 128 of FIG. 1 and the functional structure 200 of FIG. 2.

Figure 14:
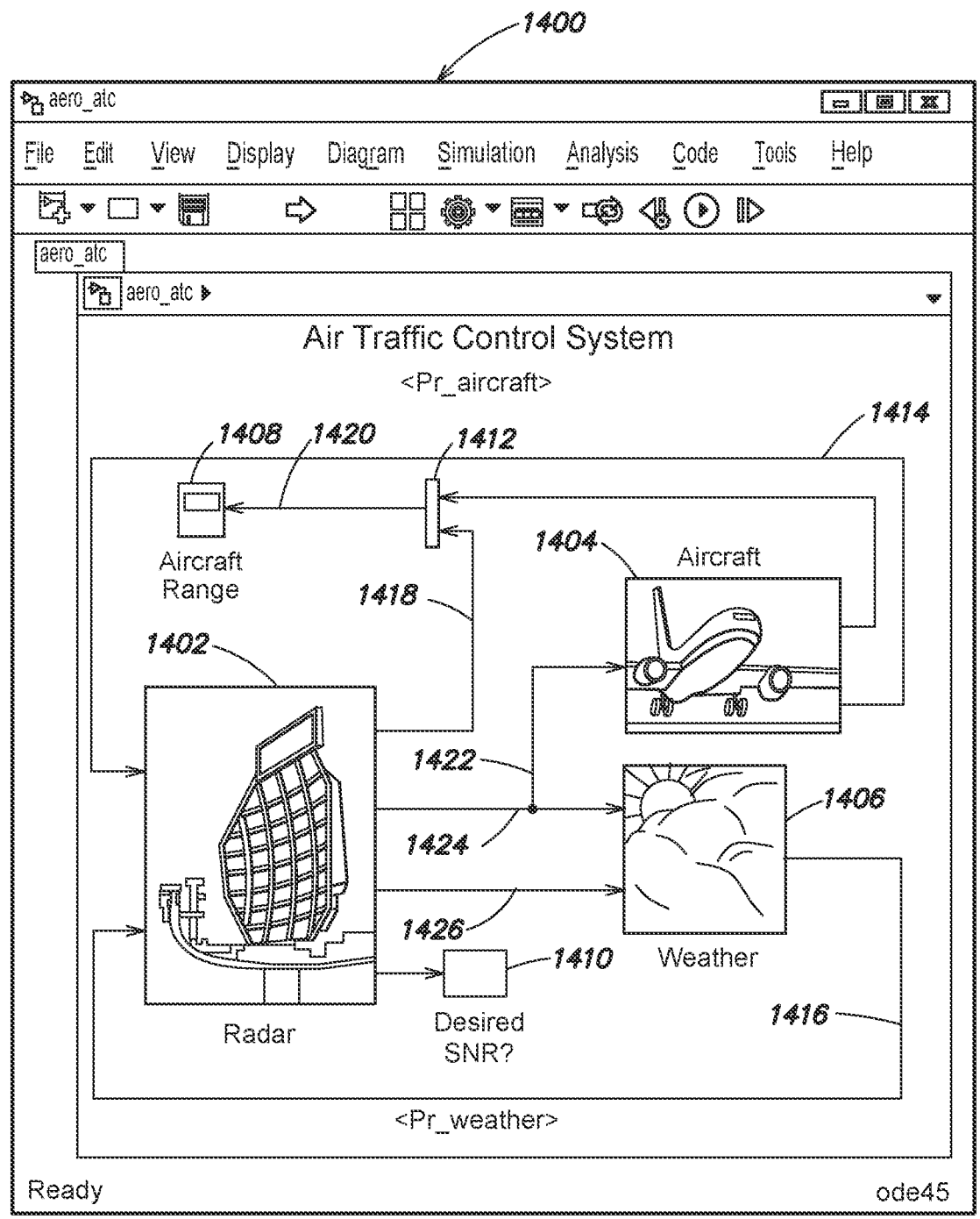
FIG. 14 is a schematic illustration of an example functional structure of a high-level system design in accordance with one or more embodiments.

FIG. 14 is a schematic illustration of an example functional structure 1400 of a high-level system design for an air traffic control (ATC) radar system in accordance with one or more embodiments. The functional structure 1400 may be graphically defined and may include elements representing systems and/or subsystems of the ATC radar system. For example, the functional structure 1400 may include an icon 1402 for a radar unit, an icon 1404 for an aircraft, and an icon 1406 for a weather system. The functional structure 1400 also may include icons for displays or scopes, such as Scope blocks 1408 and 1410 named 'Aircraft Range' and 'Desired SNR?', and a Multiplexer block 1412. In some embodiments, the functional structure 1400 may not itself be executable to simulate the ATC radar system's behavior or operation. Instead, the functional structure 1400 may provide an indication of the elements needed to design, test, or implement an ATC radar system. In some embodiments, the icons 1402, 1404, and 1406 may be placeholders for executable model components, and may not be executable components themselves. The functional structure 1400 may thus be software simulation tool-independent and model component-independent.

The functional structure 1400 may also include symbols representing data, control, or other information exchanged among the elements of the high-level system design. For example, it may include arrows 1414 and 1416 among the icons 1404, 1406, and 1402, indicating that outputs computed by the aircraft and weather elements are accessed as inputs by the radar element. The functional structure 1400 may also include arrows 1418 and 1420 among the icon 1402, the Multiplexer 1412, and the Scope block 1408, indicating that an output computed by the radar element may be displayed at the Scope block 1408. The functional structure 1400 may further include arrow 1422 among the icons 1402 and 1404, indicating that an output computed by the radar element is accessed as an input by the aircraft element 1404. The functional structure 1400 also may include arrows 1424 and 1426 among the icons 1402 and 1406, indicating that outputs computed by the radar element are accessed as inputs by the weather element. The form of the data, control, or other information exchanged among elements of the high-level system design as represented by the functional structure 1400 may vary depending on the model components used to implement the respective elements and the co-simulation partitioning of the design.

As described, the icons 1402, 1404, and 1406 may be placeholders for executable model components. For example, the high-level system design may be a Uniform Modeling Language (UML) diagram or a Systems Modeling Language (SysML) diagram, among others. In other embodiments, one or more of the icons 1402, 1404, and 1406 may represent executable model components of a specific software simulation tool. For example, in some implementations, one or more of the icons 1402, 1404, and 1406 may be model reference blocks, subsystems, Virtual Instruments (VIs), and/or variants of the Simulink model-based design environment, Functional Mock-up Units (FMUs), Dynamic Link Libraries (DLLs), etc.

Figure 15:
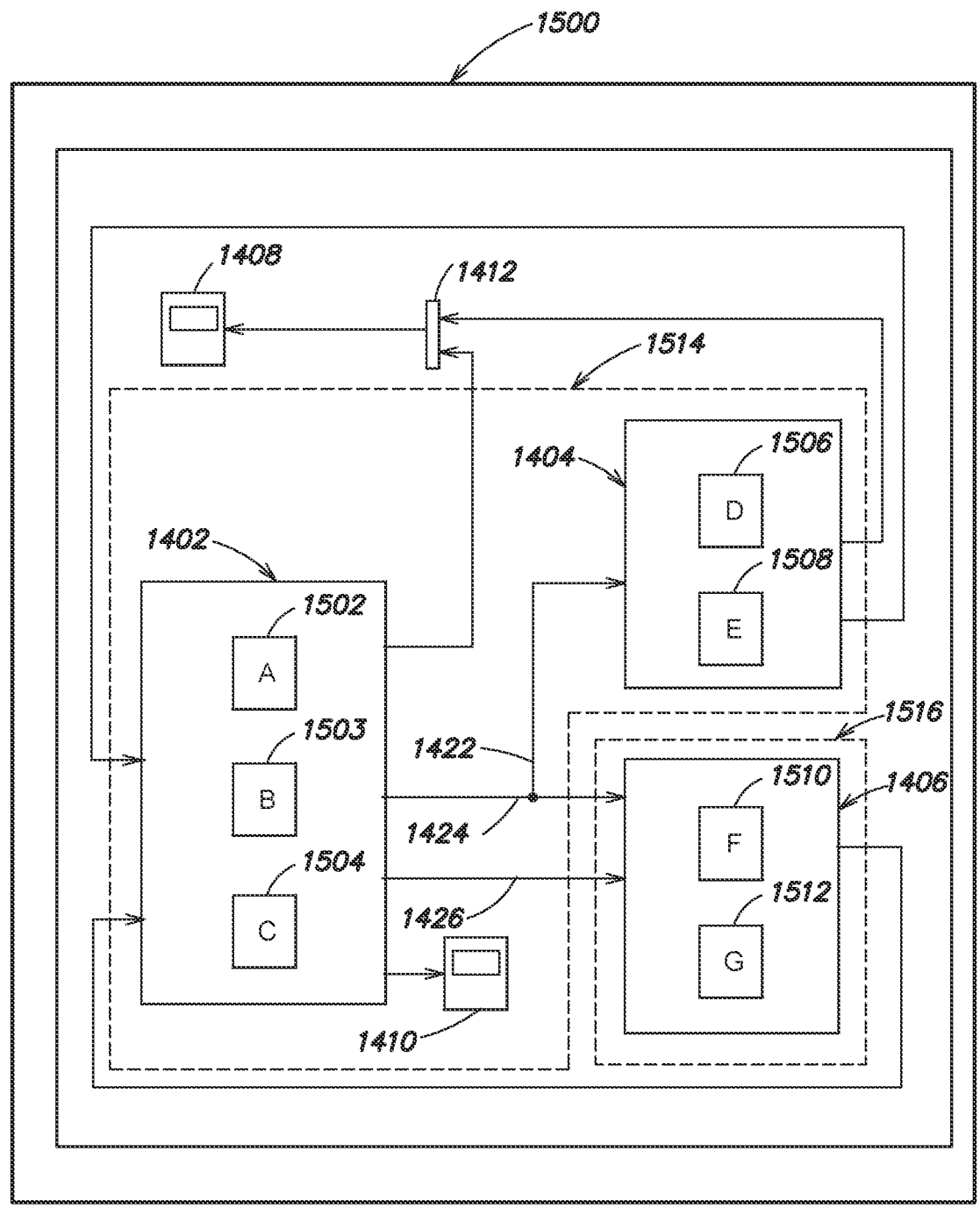
FIG. 15 is a schematic illustration of an example graphical representation of a high-level system design in accordance with one or more embodiments.

FIG. 15 is a schematic illustration of an example graphical representation 1500 of the high-level system design for the ATC radar system in accordance with one or more embodiments. The graphical representation 1500 illustrates the subsets of model components found to model the elements of the high-level system design for the ATC radar system. For example, the radar element may be simulated by three alternative model components, which are represented at the icon 1402 by blocks 1502-1504 labeled 'A', 'B', and 'C'. The aircraft element may be simulated by two alternative model components, which are represented at the icon 1404 by blocks 1506 and 1508 labeled 'D' and 'E'. The weather element may be simulated by two alternative model components, which are represented at the icon 1406 by blocks 1510 and 1512 labeled 'F' and 'G'.

In some embodiments, the integration platform 102 may display the functional structure 1400 and/or the graphical representation 1500, e.g., on the model editor window 220.

The alternative model components that simulate a given element of the high-level system design for the ATC radar system may be in different forms, and may have different characteristics and/or attributes. As described, the different characteristics and/or attributes may include simulation fidelity, memory usage, execution speed, and/or tolerance.

One or more models may be realized for the functional structure 1400 and/or the graphical representation 1500 for the ATC radar system. For example, an objective function may be setup that considers user objectives emphasizing one or more of simulation fidelity, memory usage, execution speed, and/or tolerance. The objective function may be solved by the objective function solver 126. The solution may identify selected model components to implement the elements of the high-level system design for the ATC radar system, co-simulation partitions, nodes 140 of the computer network, simulation tools and versions, communication rates, and compensators.

Suppose, for example, the objectives 130 specified by the user place a high weight on simulation fidelity as compared to execution speed and memory usage. The model partitioning engine 108 may automatically realize a co-simulation model for the high-level system design for the ATC radar system that represents a solution of the objective function as computed by the objective function solver 126 with the fidelity objective being given a high weight relative to the other objectives. The solution determined by the objective function solver 126 may provide that the connections in the high-level system design should be cut for one entity thereby creating two co-simulation partitions 1514 and 1516. For example, the solution may provide that one or more model components for the radar element and the aircraft element should be placed in one co-simulation partition, e.g., the partition 1514, and that one or more model components for the weather element should be placed in another co-simulation partition, e.g., the partition 1516. Accordingly, the solution may provide that cuts should be made at the links represented by the arrows 1416, 1424, and 1426 between radar and weather elements 1402 and 1406. Additionally, the objective function solver 126 may determine that, of the set of available model components, the model should include the model components corresponding to the block 1503 ('B') for the radar element, the model component of the block 1506 ('D') for the aircraft element, and the model component of the block 1512 ('G') for the weather element.

The solution may further provide that the partition 1514 should be run by one simulation tool, such as the Simulink® simulation environment, on one node of the computer network 106. The solution may also provide that the partition 1516 should be run by another simulation tool, such as the Weather Radar Simulation Systems (WRSS) from Rockwell Collins of Cedar Rapids, Iowa. Interfaces may be established at the cuts made in the high-level system design. For example, the solution may define one or more interfaces between the partitions 1514 and 1516.

The solution computed by the objective function solver 126 may include information for configuring the co-simulation partitions 1514 and 1516. The information may identify local execution engines and/or solvers to be used by the simulation tools running in the respective partitions 1514 and 1516. The information may indicate the step sizes to be used by the local execution engines and/or solvers, and local solver parameters, such as relative and absolute tolerance, step size, etc.

The solution determined by the objective function solver 126 may further include information for configuring the interfaces between model components placed in different co-simulation partitions. For example, the solution may include information for configuring the interface between model components 1503 ('B') and 1512 ('G') in co-simulation partitions 1514 and 1516. The information may relate to compensators, such as the location of and parameters for compensators.

In another example, the objectives 130 may place a high weight on execution speed. In this case, a solution of the objective function may result in a different partitioning of the high level system design for the ATC radar system, and a different selection of model components for the radar element, the aircraft element, and the weather element.

In addition, differences between the communication rate of data between co-simulation components and modeled sample rates, if any, may be identified. In some embodiments, these components may be placed in the same partition. Additionally or alternatively one or more compensators may be included.

The present disclosure also may be used with factory automation systems.

Figure 16:
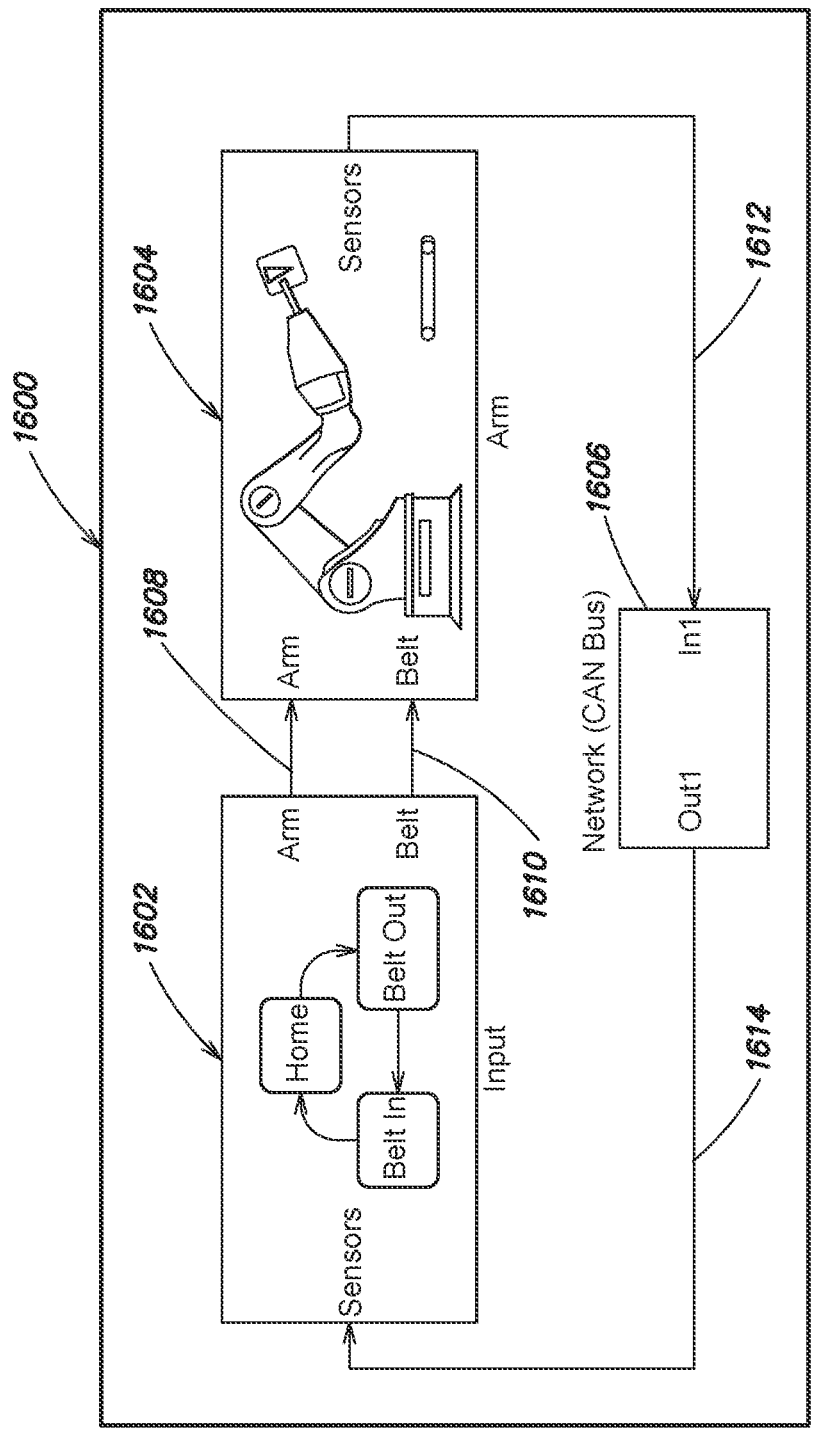
FIG. 16 is a schematic illustration of an example functional structure of a high-level system design in accordance with one or more embodiments.

FIG. 16 is a schematic illustration of an example functional structure 1600 of a high-level system design for a factory automation control system in accordance with one or more embodiments. The functional structure 1600 may be graphically defined and may include elements representing systems and/or subsystems of the factory automation control system. For example, the functional structure 1600 may include an icon 1602 for a control unit, an icon 1604 for a robotic arm, and an icon 1606 for a Controller Area Network (CAN) bus element. In some embodiments, the functional structure 1600 may not itself be executable to simulate the factory automation control system's behavior or operation. Instead, the functional structure 1600 may provide an indication of the elements needed to design, test, or implement a factory automation control system. In some embodiments, the icons 1602, 1604, and 1606 may be placeholders for executable model components, and may not be executable components themselves. The functional structure 1600 may thus be software simulation tool-independent and model component-independent.

The functional structure 1600 may also include symbols representing data, control, or other information exchanged among the elements of the high-level system design. For example, it may include arrows 1608 and 1610 among the icons 1602 and 1604, indicating that outputs computed by the control element are accessed as inputs by the robotic arm element. The functional structure 1600 may also include arrows 1612 and 1614 among the icons 1604, 1606, and 1602, indicating that an output computed by the robotic arm may be accessed by the CAN bus element, and an output of the CAN bus element may be accessed by the controller element. The form of the data, control, or other information exchanged among elements of the high-level system design as represented by the functional structure 1600 may vary depending on the model components used to implement the respective elements and the co-simulation partitioning of the design.

As described, the icons 1602, 1604, and 1606 may be placeholders for executable model components. In other embodiments, one or more of the icons 1602, 1604, and 1606 may represent executable model components of a specific software simulation tool.

Figure 17:
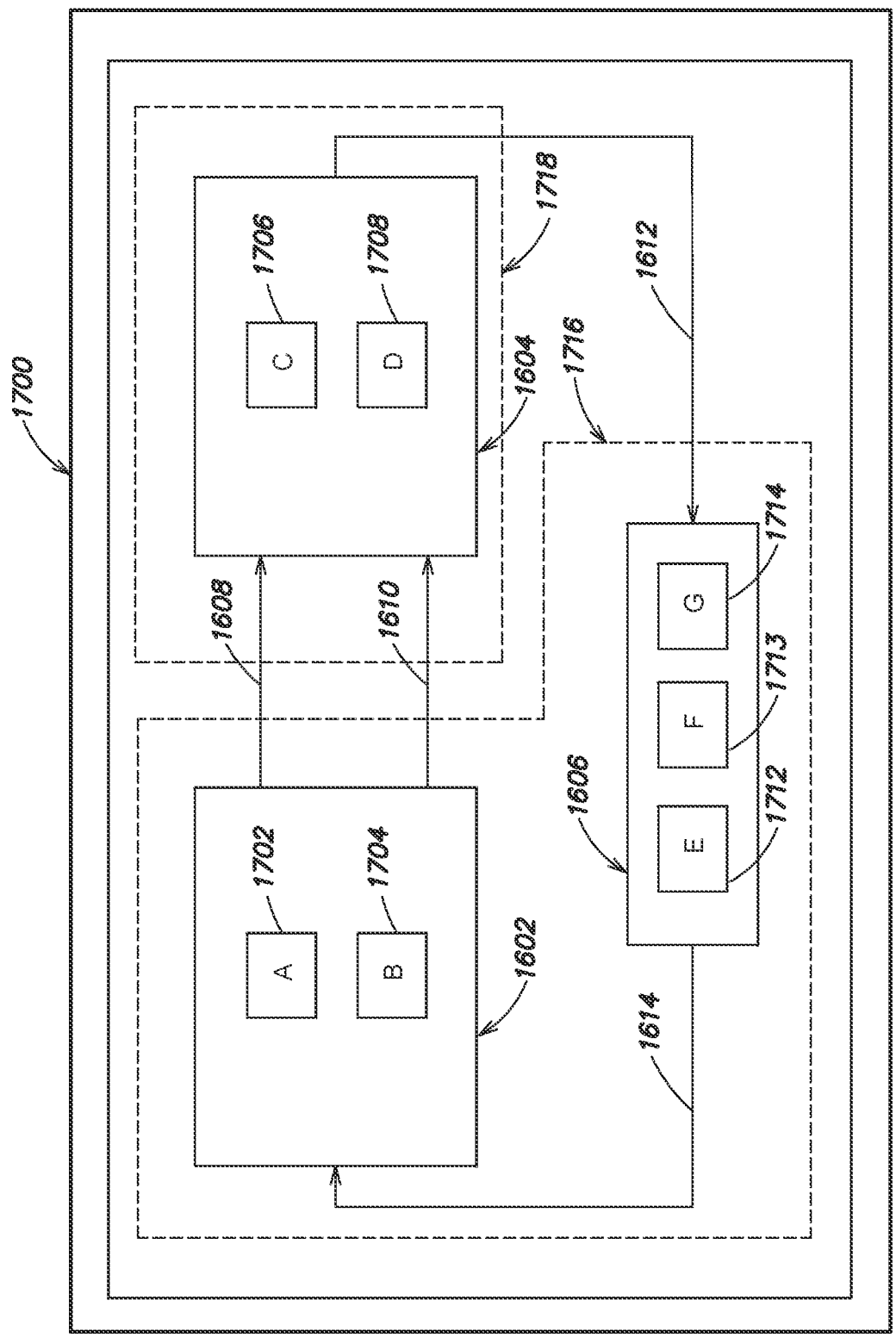
FIG. 17 is a schematic illustration of an example graphical representation of a high-level system design in accordance with one or more embodiments.

FIG. 17 is a schematic illustration of an example graphical representation 1700 of the high-level system design for the factory automation control system in accordance with one or more embodiments. The graphical representation 1700 illustrates the subsets of model components found to model the elements of the high-level system design for the factory automation control system. For example, the controller element may be simulated by two alternative model components, which are represented at the icon 1602 by block 1702 labeled 'A' and 1704 labeled 'B'. The robotic arm element may be simulated by two alternative model components, which are represented at the icon 1604 by block 1706 labeled 'C' and block 1708 labeled 'D'. The CAN bus element may be simulated by three alternative model components, which are represented at the icon 1606 by blocks 1710-1712 labeled 'E', 'F', and 'G'.

In some embodiments, the integration platform 102 may display the functional structure 1600 and/or the graphical representation 1700, e.g., on the model editor window 220.

The alternative model components that simulate a given element of the high-level system design for the factory automation control system may be in different forms, and may have different characteristics and/or attributes. As described, the different characteristics and/or attributes may include simulation fidelity, memory usage, execution speed, and/or tolerance.

One or more models may be realized for the functional structure 1600 and/or the graphical representation 1700 for the factory automation control system. For example, an objective function may be setup that considers user objectives emphasizing one or more of simulation fidelity, memory usage, execution speed, and/or tolerance. The objective function may be solved by the objective function solver 126. The solution may identify selected model components to implement the elements of the high-level system design for the factory automation control system, co-simulation partitions, nodes 140 of the computer network, simulation tools and versions, communication rates, and compensators.

Suppose, for example, the objectives 130 specified by the user place a high weight on execution speed as compared to simulation fidelity and memory usage. The model partitioning engine 108 may automatically realize a co-simulation model for the high-level system design for the factory automation control system that represents a solution of the objective function as computed by the objective function solver 126 with the execution speed objective being given a high weight relative to the other objectives. The solution determined by the objective function solver 126 may provide that the high-level system design should be cut for one entity thereby creating two co-simulation partitions 1716 and 1718. For example, the solution may provide that one or more model components for the controller element and the CAN bus element should be placed in one co-simulation partition, e.g., the partition 1716, and that one or more model components for the robotic arm element should be placed in another co-simulation partition, e.g., the partition 1718. Accordingly, the solution may provide that a cut should be made at the links represented by the arrows 1608 and 1610 between controller and robotic arm elements and another cut should be made at the link represented by the arrow 1612 between the robotic arm element and CAN bus element. Additionally, the objective function solver 126 may determine that, of the set of available model components, the model should include the model components corresponding to the block 1704 ('B') for the controller element, the model component of the block 1706 ('C') for the robotic arm element, and the model component of the block 1712 ('E') for the CAN bus element.

The solution may further provide that the partition 1716 should be run by one simulation tool, such as the Simulink® simulation environment, on one node of the computer network 106. The solution may also provide that the partition 1718 should be run by another simulation tool, such as the RoboDK simulation environment from RoboDK Inc. of Montreal Canada. Interfaces may be established at the cuts made in the high-level system design. For example, the solution may define one or more interfaces between the partitions 1716 and 1718.

The solution computed by the objective function solver 126 may include information for configuring the co-simulation partitions 1716 and 1718. The information may identify local execution engines and/or solvers to be used by the simulation tools running in the respective partitions 1716 and 1718. The information may indicate the step sizes to be used by the local execution engines and/or solvers, and local solver parameters, such as relative and absolute tolerance, step size, etc.

The solution determined by the objective function solver 126 may further include information for configuring the interfaces between model components placed in different co-simulation partitions. For example, the solution may include information for configuring the interface between model components 1704 ('B') and 1706 ('C') and between model components 1706 ('C') and 1712 ('E'). The information may relate to compensators, such as the location of and parameters for compensators.

In another example, the objectives 130 may place a high weight on memory usage. In this case, a solution of the objective function may result in a different partitioning of the high level system design for the factory automation control system, and a different selection of model components for the controller element, the robotic arm element, and the CAN bus element.

In addition, differences between the communication rate of data between co-simulation components and modeled sample rates, if any, may be identified. In some embodiments, these components may be placed in the same partition. Additionally or alternatively one or more compensators may be included.

Data Processing Device

Figure 11:
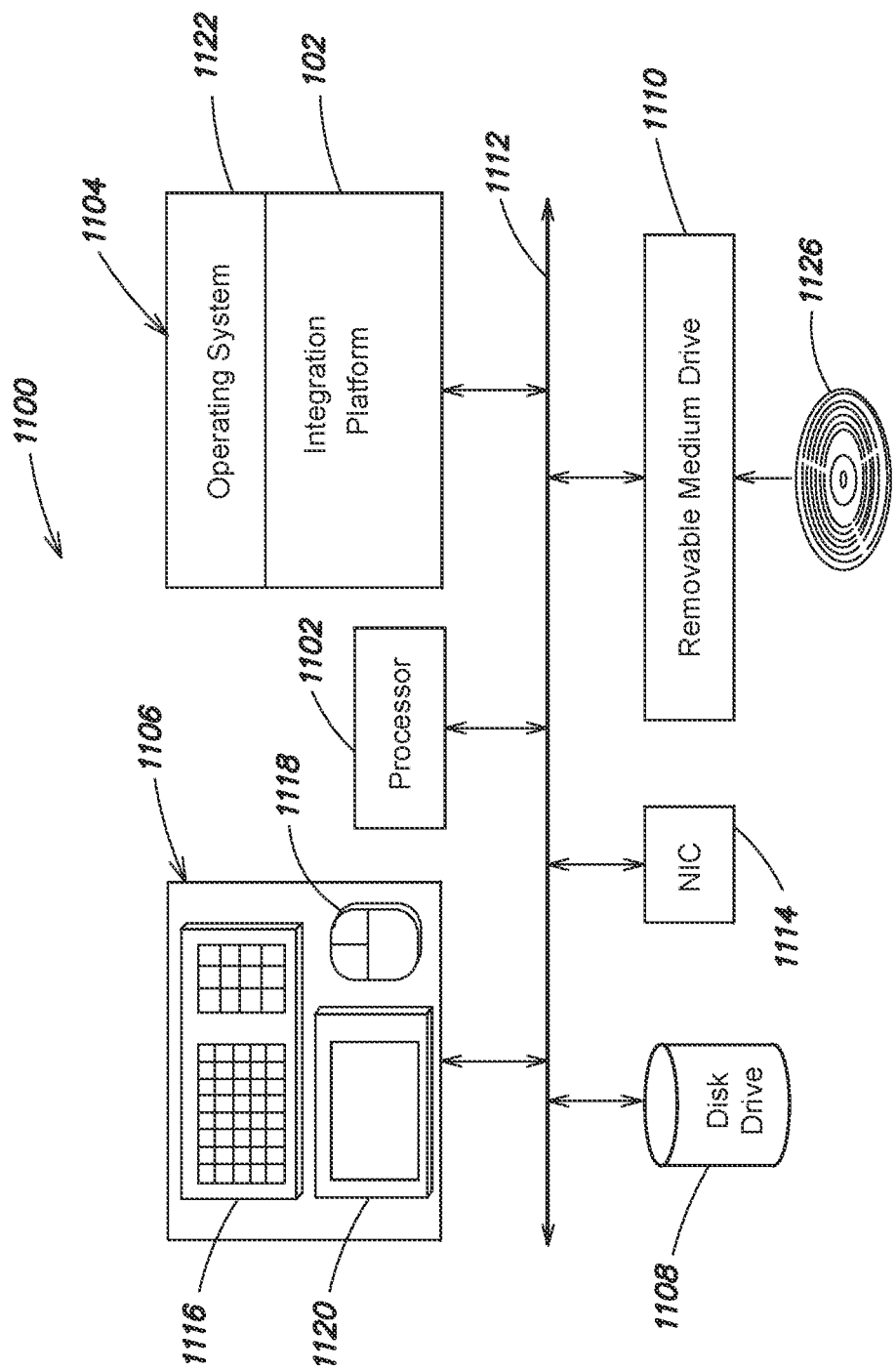
FIG. 11 is a schematic illustration of an example data processing system in accordance with one or more embodiments.

FIG. 11 is a schematic illustration of an example computer or data processing system 1100 in which systems and/or methods of the present disclosure may be implemented in accordance with one or more embodiments. The computer system 1100 may include one or more processing elements, such as a processor 1102, a main memory 1104, user input/output (I/O) 1106, a persistent data storage unit, such as a disk drive 1108, and a removable medium drive 1110 that are interconnected by a system bus 1112. The computer system 1100 may also include a communication unit, such as a network interface card (NIC) 1114. The user I/O 1106 may include a keyboard 1116, a pointing device, such as a mouse 1118, and a display 1120. Other user I/O 1106 components include voice or speech command systems, touchpads and touchscreens, printers, projectors, etc. Exemplary processors include single or multi-core Central Processing Units (CPUs), Graphics Processing Units (GPUs), Field Programmable Gate Arrays (FPGAs), Application Specific Integrated Circuits (ASICs), microprocessors, microcontrollers, etc.

The main memory 1104, which may be a Random Access Memory (RAM), may store a plurality of program libraries or modules, such as an operating system 1122, and one or more application programs that interface to the operating system 1122, such as the integration platform 102.

The removable medium drive 1110 may accept and read a computer readable medium 1126, such as a CD, DVD, floppy disk, solid state drive, tape, flash memory or other non-transitory medium. The removable medium drive 1110 may also write to the computer readable medium 1126.

Suitable computer systems include personal computers (PCs), workstations, servers, laptops, tablets, palm computers, smart phones, electronic readers, and other portable computing devices, etc. Nonetheless, those skilled in the art will understand that the computer system 1100 of FIG. 11 is intended for illustrative purposes only, and that the present invention may be used with other computer, data processing, or computational systems or devices. The present invention may also be used in a computer network, e.g., client-server, architecture, or a public and/or private cloud computing arrangement. For example, the simulation environment 1100 may be hosted on one or more cloud servers or devices, and accessed by remote clients through a web portal or an application hosting system, such as the Remote Desktop Connection tool from Microsoft Corp.

Suitable operating systems 1122 include the Windows series of operating systems from Microsoft Corp. of Redmond, Wash., the Android and Chrome OS operating systems from Google Inc. of Mountain View, Calif., the Linux operating system, the MAC OS® series of operating systems from Apple Inc. of Cupertino, Calif., and the UNIX® series of operating systems, among others. The operating system 1122 may provide services or functions for applications or modules, such as allocating memory, organizing data objects or files according to a file system, prioritizing requests, managing I/O, etc. The operating system 1122 may run on a virtual machine, which may be provided by the data processing system 1100.

As indicated above, a user, such as an engineer, scientist, programmer, developer, etc., may utilize one or more input devices, such as the keyboard 1116, the mouse 1111, and the display 1120 to operate the integration platform 102 to automatically realize a model from a high-level system design, and to run the realized model in a co-simulation manner. As discussed, co-simulation components may be computational and may have executable semantics. In particular, the co-simulation components may be simulated or run. In particular, the co-simulation components may provide one or more of time-based, event-based, state-based, message-based, frequency-based, control-flow based, and dataflow-based execution semantics. The execution of a realized model may simulate operation of the high-level system design. The term graphical model is intended to include graphical program.

Distributed Network

Figure 12:
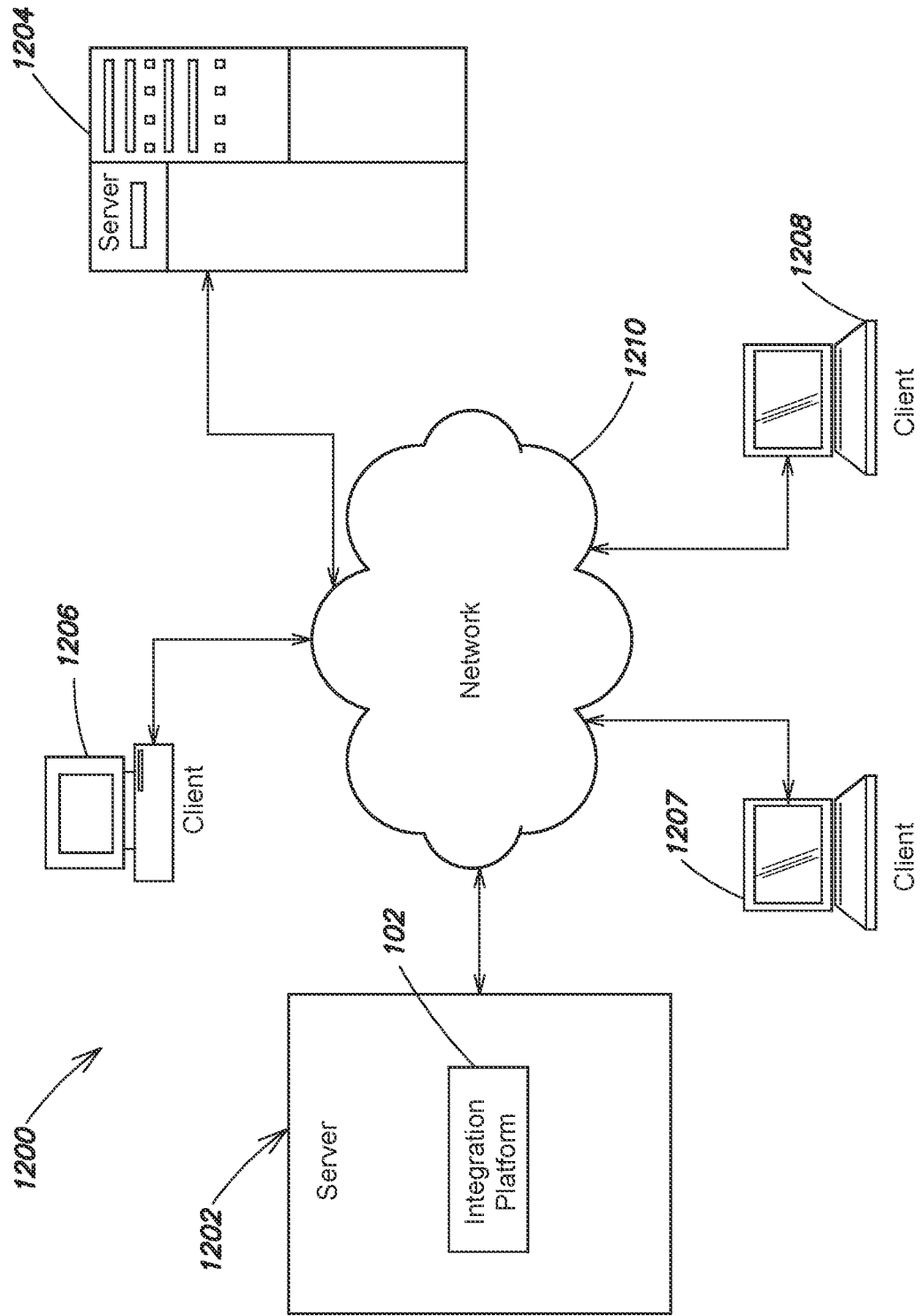
FIG. 12 is a schematic diagram of an example distributed computing environment in accordance with one or more embodiments.

FIG. 12 is a schematic diagram of an example distributed computing environment 1200 in which systems and/or methods of the present disclosure may be implemented in accordance with one or more embodiments. The environment 1200 may include client and server devices, such as two servers 1202 and 1204, and three clients 1206-1208, interconnected by one or more networks, such as network 1210. The devices of the environment 1200 may interconnect via wired connections, wireless connections, or a combination of wired and wireless connections. The servers 1202 and 1204 may include one or more devices capable of receiving, generating, storing, processing, executing, and/or providing information. For example, the servers 1202 and 1204 may include a computing device, such as a server, a desktop computer, a laptop computer, a tablet computer, a handheld computer, or a similar device. The servers 1202 and 1204 may host one or more applications. For example, the server 1202 may host the integration platform 102.

The clients 1206-1208 may be capable of receiving, generating, storing, processing, executing, and/or providing information. Information may include any type of machine-readable information having substantially any format that may be adapted for use, e.g., in one or more networks and/or with one or more devices. The information may include digital information and/or analog information. The information may further be packetized and/or non-packetized. In an embodiment, the clients 1206-1208 may download data and/or code from the servers 1202 and 1204 via the network 1210. In some implementations, the clients 1206-1208 may be desktop computers, workstations, laptop computers, tablet computers, handheld computers, mobile phones (e.g., smart phones, radiotelephones, etc.), electronic readers, or similar devices. In some implementations, the clients 1206-1208 may receive information from and/or transmit information to the servers 1202 and 1204.

The network 1210 may include one or more wired and/or wireless networks. For example, the network 1210 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks. Information may be exchanged between network devices using any network protocol, such as, but not limited to, the Internet Protocol (IP), Asynchronous Transfer Mode (ATM), Synchronous Optical Network (SONET), the User Datagram Protocol (UDP), Institute of Electrical and Electronics Engineers (IEEE) 802.11, etc.

The number of devices and/or networks shown in FIG. 12 is provided as an example. In practice, there may be additional devices and/or networks, fewer devices and/or networks, different devices and/or networks, or differently arranged devices and/or networks than those shown in FIG. 12. Furthermore, two or more devices shown in FIG. 12 may be implemented within a single device, or a single device shown in FIG. 12 may be implemented as multiple, distributed devices. Additionally, one or more of the devices of the distributed computing environment 1200 may perform one or more functions described as being performed by another one or more devices of the environment 1200.

The foregoing description of embodiments is intended to provide illustration and description, but is not intended to be exhaustive or to limit the disclosure to the precise form disclosed. Modifications and variations are possible in light of the above teachings or may be acquired from a practice of the disclosure. For example, while a series of acts has been described above with respect to the flow diagrams, the order of the acts may be modified in other implementations. In addition, the acts, operations, and steps may be performed by additional or other modules or entities, which may be combined or separated to form other modules or entities. Further, non-dependent acts may be performed in parallel. Also, the term "user", as used herein, is intended to be broadly interpreted to include, for example, a computer or data processing system or a human user of a computer or data processing system, unless otherwise stated.

Further, certain embodiments of the disclosure may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer or data processing system, such as system 1100. The computer-executable instructions may include instructions that implement one or more embodiments of the disclosure. The tangible non-transitory computer-readable storage media may be volatile or non-volatile and may include, for example, flash memories, dynamic memories, removable disks, and non-removable disks.

No element, act, or instruction used herein should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

In view of the above this application discloses, among other things, the following items:

Item 1. A computer-implemented method comprising: accessing a high-level system design of a system, wherein the high-level system design includes elements that represent parts of the system; accessing one or more objectives associated with the high-level system design, wherein the one or more objectives include at least one of fidelity, execution speed, and/or memory usage; analyzing executable model components to identify attributes of a plurality of alternative executable model components that model the elements of the high-level system design, wherein the attributes include a fidelity quality, an execution speed quality, and/or a memory usage quality of the plurality of alternative executable model components; computing compensation parameters for connections between candidate pairs of model components from the plurality of alternative model components, wherein the compensation parameters correct errors occurring during data exchange between the candidate pairs of model components; setting up an objective function using the one or more objectives, the attributes of the plurality of alternative executable model components and the compensation parameters; solving the objective function to partition the high-level system design into a realized model based on the one or more objectives of at least one of fidelity, execution speed, and/or memory usage, wherein the realized model includes: two or more co-simulation partitions including selected executable model components from the plurality of alternative executable model components, and compensators for interfaces between the two or more co-simulation partitions that implement selected compensation parameters from the compensation parameters; and running the realized model in a co-simulation manner.

Item 2. The computer-implemented method of item 1 further comprising: identifying available simulation tools for running the plurality of alternative model components, wherein the objective function is further setup to consider the one or more of the available simulation tools, and the realized model includes selected simulation tools from the available simulation tools.

Item 3. The computer-implemented method of one or more of items 1 to 2 further comprising: performing network discovery of a computer network to derive characteristics that identify available hardware resources including network nodes for hosting the simulation tools, and processing capability and memory capacity of the network nodes, and available communication links among the network nodes, wherein the objective function is further setup to consider the characteristics derived from the computer network, and the realized model includes selected network nodes from the available hardware resources and selected communication links from the available communication links.

Item 4. The computer-implemented method of item 3 further comprising: configuring the selected simulation tools to run the selected executable co-simulation components; and configuring the selected network nodes to host the selected simulation tools.

Item 5. The computer-implemented method of one or more of items 1 to 4 further comprising: accessing one or more user-specified hard constraints associated with the high-level system design, wherein the setting up the objective function further uses the one or more user-specified hard constraints, and the solving the objective function further meets the one or more user-specified hard constraints.

Item 6. The computer-implemented method of item 5 wherein the one or more user-specified hard constraints specifies at least one of a given simulation tool, a given co-simulation component, a model block, a given network node, and/or a given communication link for inclusion in or omission from the realized model.

Item 7. The computer-implemented method of one or more of items 1 to 6 wherein the solving is performed in stages, and a result from a current stage is presented before proceeding to a next stage.

Item 8. The computer-implemented method of item 7 further comprising: receiving user approval of the current stage prior to the proceeding to the next stage.

Item 9. The computer-implemented method of one or more of items 1 to 8 further comprising: assessing the running of the realized model against the one or more objectives; modifying the one or more objectives; and repeating the analyzing, computing, setting up, solving, and running steps.

Item 10. The computer-implemented method of one or more of items 1 to 9 wherein the objective function is a cost function, an energy function, a reward function, and/or a utility function.

Item 11. The computer-implemented method of one or more of items 1 to 10 wherein the elements of the high-level system design are not executable.

Item 12. The computer-implemented method of one or more of items 1 to 11 wherein the one or more objectives are user-specified, and the one or more objectives are included in the objective function in the form of weights.

Item 13. The computer-implemented method of one or more of items 1 to 12 wherein the realized model is run by a master execution engine and a master solver that manage a subordinate execution engine and a subordinate solver at one or more of the selected network nodes.

Item 14. One or more non-transitory computer-readable media, having stored thereon instructions that when executed by a computing device, cause the computing device to perform operations comprising: accessing a high-level system design of a system, wherein the high-level system design includes elements that represent parts of the system; accessing one or more objectives associated with the high-level system design, wherein the one or more objectives include at least one of fidelity, execution speed, and/or memory usage; analyzing executable model components to identify attributes of a plurality of alternative executable model components that model the elements of the high-level system design, the attributes include a fidelity quality, an execution speed quality, and/or a memory usage quality of the plurality of alternative executable model components; computing compensation parameters for connections between candidate pairs of model components from the plurality of alternative model components, wherein the compensation parameters correct errors occurring during data exchange between the candidate pairs of model components; setting up an objective function using the one or more objectives, the attributes of the plurality of alternative executable model components and the compensation parameters; solving the objective function to partition the high-level system design into a realized model based on the one or more objectives of at least one of fidelity, execution speed, and/or memory usage, wherein the realized model includes: two or more co-simulation partitions including selected executable model components from the plurality of alternative executable model components, and compensators for interfaces between the two or more co-simulation partitions that implement selected compensation parameters from the compensation parameters; and running the realized model in a co-simulation manner.

Item 15. The one or more non-transitory computer-readable media of item 14 wherein the instructions cause the computing device to perform operations further comprising: identifying available simulation tools for running the plurality of alternative model components, wherein the objective function is further setup to consider the one or more of the available simulation tools, and the realized model includes selected simulation tools from the available simulation tools.

Item 16. The one or more non-transitory computer-readable media of one or more of items 14 to 15 wherein the instructions cause the computing device to perform operations further comprising: accessing one or more user-specified hard constraints associated with the high-level system design, wherein the setting up the objective function further uses the one or more user-specified hard constraints, and the solving the objective function further meets the one or more user-specified hard constraints.

Item 17. The one or more non-transitory computer-readable media of one or more of items 14 to 16 wherein the solving is performed in stages, and a result from a current stage is presented before proceeding to a next stage.

Item 18. An apparatus comprising: one or more memories storing a high-level system design of a system, wherein the high-level system design includes elements that represent parts of the system; and one or more processors coupled to the one or more memories, the one or more processors configured to: access one or more objectives associated with the high-level system design, wherein the one or more objectives include at least one of fidelity, execution speed, and/or memory usage; analyze executable model components to identify attributes of a plurality of alternative executable model components that model the elements of the high-level system design, the attributes include a fidelity quality, an execution speed quality, and/or a memory usage quality of the plurality of alternative executable model components; compute compensation parameters for connections between candidate pairs of model components from the plurality of alternative model components, wherein the compensation parameters correct errors occurring during data exchange between the candidate pairs of model components; set up an objective function using the one or more objectives, the attributes of the plurality of alternative executable model components and the compensation parameters; solve the objective function to partition the high-level system design into a realized model based on the one or more objectives of at least one of fidelity, execution speed, and/or memory usage, wherein the realized model includes: two or more co-simulation partitions including selected executable model components from the plurality of alternative executable model components, and compensators for interfaces between the two or more co-simulation partitions that implement selected compensation parameters from the compensation parameters; and run the realized model in a co-simulation manner.

Item 19. The apparatus of item 18 wherein the one or more processors are further configured to: identify available simulation tools for running the plurality of alternative model components, wherein the objective function is further setup to consider the one or more of the available simulation tools, and the realized model includes selected simulation tools from the available simulation tools.

Item 20. The apparatus of one or more of items 18 to 19 wherein the one or more processors are further configured to: access one or more user-specified hard constraints associated with the high-level system design, wherein the setting up the objective function further uses the one or more user-specified hard constraints, and the solving the objective function further meets the one or more user-specified hard constraints.

The foregoing description has been directed to specific embodiments of the present disclosure. It will be apparent, however, that other variations and modifications may be made to the described embodiments, with the attainment of some or all of their advantages. For example, generated code may be utilized advantageously with other embedded hardware, such as embedded hardware that includes floating point cores. Therefore, it is the object of the appended claims to cover all such variations and modifications as come within the true spirit and scope of the disclosure.

What is claimed is:

1. A computer-implemented method comprising:
presenting a system design of a system, wherein the system design includes elements that represent parts of the system;
receiving a selection of one or more objectives associated with the system design, wherein the one or more objectives include at least one of fidelity, execution speed, memory usage, tolerance, code generation, quality of service, or real-time execution;
analyzing executable model components to identify attributes of a plurality of alternative executable model components that model the elements of the system design, wherein the attributes include a fidelity quality, an execution speed quality, a memory usage quality, a tolerance quality, a code generation quality, a quality of service quality, or a real-time execution quality of the plurality of alternative executable model components;
setting up an objective function using the one or more objectives, the attributes of the plurality of alternative executable model components, and interface configuration parameters;
solving the objective function to partition the system design into a realized model based on the one or more objectives of at least one of fidelity, execution speed, memory usage, tolerance, code generation, quality of service, or real-time execution, wherein the realized model includes:
two or more co-simulation partitions including selected executable model components from the plurality of alternative executable model components, and
at least one of the interface configuration parameters for one or more interfaces between the two or more co-simulation partitions;
presenting the realized model; and
executing the realized model in a co-simulation manner.

2. The computer-implemented method of claim 1 further comprising:
providing metadata on one or more of the executable model components through an application programming interface (API) of the one or more of the executable model components.

3. The computer-implemented method of claim 2 wherein the API is a Functional Mock-Up Interface (FMI) or an S-function API.

4. The computer-implemented method of claim 1 wherein the solving includes:
   determining one or more changes to a configuration parameter of at least one of the selected executable model components.

5. The computer-implemented method of claim 4 wherein the one or more changes alters the fidelity quality, the execution speed quality, the memory usage quality, the tolerance quality, the code generation quality, the quality of service quality, or the real-time execution quality of the at least one of the selected executable model components.

6. The computer-implemented method of claim 1 further comprising:
   during the executing the realized model, dynamically updating a step size of a communication rate for a connection between two of the selected executable model components included in the realized model.

7. The computer-implemented method of claim 1 wherein the one or more objectives are presented on at least one user interface for user selection.

8. The computer-implemented method of claim 1 wherein the solving includes determining a partial solution, the computer-implemented method further comprising:
   presenting at least a portion of the partial solution; and
   receiving user feedback on the partial solution.

9. The computer-implemented method of claim 8 further comprising:
   freezing the partial solution; and
   resuming the solving following the freezing.

10. The computer-implemented method of claim 1 wherein the objective function is a cost function, an energy function, a reward function, or a utility function.

11. The computer-implemented method of claim 1 wherein the interface configuration parameters are computed for connections between candidate pairs of model components from the plurality of alternative model components, wherein the interface configuration parameters manage data exchanged between the candidate pairs of model components.

12. The computer-implemented method of claim 11 wherein the interface configuration parameters include compensation parameters that correct errors occurring during the data exchange between the pairs of model components of the realized model.

13. The computer-implemented method of claim 1 wherein the realized model is executed by a master execution engine and a master solver that manage a subordinate execution engine and a subordinate solver.

14. The computer-implemented method of claim 4 wherein the configuration parameter is at least one of a solver choice, a buffer reuse setting, a diagnostic option, a logging option, a visualization option, a parameter tuning option, an execution setting, an optimization option, or a register setting.

15. One or more non-transitory computer-readable media, having stored thereon instructions that, when executed by a computing device, cause the computing device to perform operations comprising:
   presenting a system design of a system, wherein the system design includes elements that represent parts of the system;
   receiving a selection of one or more objectives associated with the system design, wherein the one or more objectives include at least one of fidelity, execution speed, memory usage, tolerance, code generation, quality of service, or real-time execution;
   analyzing executable model components to identify attributes of a plurality of alternative executable model components that model the elements of the system design, wherein the attributes include a fidelity quality, an execution speed quality, a memory usage quality, a tolerance quality, a code generation quality, a quality of service quality, or a real-time execution quality of the plurality of alternative executable model components;
   setting up an objective function using the one or more objectives, the attributes of the plurality of alternative executable model components, and interface configuration parameters;
   solving the objective function to partition the system design into a realized model based on the one or more objectives of at least one of fidelity, execution speed, memory usage, tolerance, code generation, quality of service, or real-time execution, wherein the realized model includes:
      two or more co-simulation partitions including selected executable model components from the plurality of alternative executable model components, and
      at least one of the interface configuration parameters for one or more interfaces between the two or more co-simulation partitions;
   presenting the realized model; and
   executing the realized model in a co-simulation manner.

16. The one or more non-transitory computer-readable media of claim 15, wherein the instructions cause the computing device to perform operations further comprising:
   providing metadata on one or more of the executable model components through an application programming interface (API) of the one or more of the executable model components.

17. The one or more non-transitory computer-readable media of claim 16, wherein the API is a Functional Mock-Up Interface (FMI) or an S-function API.

18. The one or more non-transitory computer-readable media of claim 15, wherein the solving includes:
   determining one or more changes to a configuration parameter of at least one of the selected executable model components.

19. The one or more non-transitory computer-readable media of claim 18, wherein the one or more changes alters the fidelity quality, the execution speed quality, the memory usage quality, the tolerance quality, the code generation quality, the quality of service quality, or the real-time execution quality of the at least one of the selected executable model components.

20. The one or more non-transitory computer-readable media of claim 18, wherein the configuration parameter is at least one of a solver choice, a buffer reuse setting, a diagnostic option, a logging option, a visualization option, a parameter tuning option, an execution setting, an optimization option, or a register setting.

21. The one or more non-transitory computer-readable media of claim 15, wherein the instructions cause the computing device to perform operations further comprising:
   during the executing the realized model, dynamically updating a step size of a communication rate for a connection between two of the selected executable model components included in the realized model.

22. The one or more non-transitory computer-readable media of claim 15, wherein the one or more objectives are presented on at least one user interface for user selection.

23. The one or more non-transitory computer-readable media of claim 15, wherein the solving includes determining a partial solution, and the instructions cause the computing device to perform operations further comprising:
   presenting at least a portion of the partial solution; and
   receiving user feedback on the partial solution.

24. The one or more non-transitory computer-readable media of claim 23, wherein the instructions cause the computing device to perform operations further comprising:
   freezing the partial solution; and
   resuming the solving following the freezing.

25. The one or more non-transitory computer-readable media of claim 15, wherein the objective function is a cost function, an energy function, a reward function, or a utility function.

26. The one or more non-transitory computer-readable media of claim 15, wherein the interface configuration parameters are computed for connections between candidate pairs of model components from the plurality of alternative model components, wherein the interface configuration parameters manage data exchanged between the candidate pairs of model components.

27. The one or more non-transitory computer-readable media of claim 26, wherein the interface configuration parameters include compensation parameters that correct errors occurring during the data exchange between the pairs of model components of the realized model.

28. The one or more non-transitory computer-readable media of claim 15, wherein the realized model is executed by a master execution engine and a master solver that manage a subordinate execution engine and a subordinate solver.

29. An apparatus comprising:
   one or more memories storing a system design of a system, wherein the system design includes elements that represent parts of the system;
   a display; and
   one or more processors coupled to the one or more memories and to the display, the one or more processors configured to:
      present the system design on the display;
      receive a selection of one or more objectives associated with the system design, wherein the one or more objectives include at least one of fidelity, execution speed, memory usage, tolerance, code generation, quality of service, or real-time execution;
      analyze executable model components to identify attributes of a plurality of alternative executable model components that model the elements of the system design, wherein the attributes include a fidelity quality, an execution speed quality, a memory usage quality, a tolerance quality, a code generation quality, a quality of service quality, or a real-time execution quality of the plurality of alternative executable model components;
      set up an objective function using the one or more objectives, the attributes of the plurality of alternative executable model components, and interface configuration parameters;
      solve the objective function to partition the system design into a realized model based on the one or more objectives of at least one of fidelity, execution speed, memory usage, tolerance, code generation, quality of service, or real-time execution, wherein the realized model includes:
         two or more co-simulation partitions including selected executable model components from the plurality of alternative executable model components, and
         at least one of the interface configuration parameters for one or more interfaces between the two or more co-simulation partitions;
      present the realized model on the display; and
      execute the realized model in a co-simulation manner.

30. The apparatus of claim 29 wherein the one or more processors are further configured to:
   provide metadata on one or more of the executable model components through an application programming interface (API) of the one or more of the executable model components.

31. The apparatus of claim 29 wherein the solving includes:
   determining one or more changes to a configuration parameter of at least one of the selected executable model components, and wherein the one or more changes alters the fidelity quality, the execution speed quality, the memory usage quality, the tolerance quality, the code generation quality, the quality of service quality, or the real-time execution quality of the at least one of the selected executable model components.

32. The apparatus of claim 29 wherein the one or more processors is further configured to:
   during the executing the realized model, dynamically update a step size of a communication rate for a connection between two of the selected executable model components included in the realized model.

33. The apparatus of claim 29 wherein the solving includes determining a partial solution, and wherein the one or more processors are further configured to:
   present at least a portion of the partial solution on the display; and
   receiving user feedback on the partial solution.

34. The apparatus of claim 29 wherein the interface configuration parameters are computed for connections between candidate pairs of model components from the plurality of alternative model components, wherein the interface configuration parameters manage data exchanged between the candidate pairs of model components.

* * * * *

UNITED STATES PATENT AND TRADEMARK OFFICE
CERTIFICATE OF CORRECTION

PATENT NO. : 11,520,956 B2  
APPLICATION NO. : 17/352818  
DATED : December 6, 2022  
INVENTOR(S) : Haihua Feng et al.

Page 1 of 1

It is certified that error appears in the above-identified patent and that said Letters Patent is hereby corrected as shown below:

In the Specification

Column 23, Line 47:  
"labeled 'I' and the block 316 labeled T can each simulate the"  
Should read:  
--labeled 'I' and the block 316 labeled 'J' can each simulate the--

Column 29, Lines 37-38:  
"labeled T that simulate the driver element that the co-  
simulation component of block 316 ('I') has the highest"  
Should read:  
--labeled 'J' that simulate the driver element that the co-  
simulation component of block 316 ('J') has the highest--

Column 35, Line 46:  
"ing errors during execution of the model in a co-w simula-"  
Should read:  
--ing errors during execution of the model in a co-simula- --

Signed and Sealed this  
Thirteenth Day of May, 2025

Coke Morgan Stewart  
*Acting Director of the United States Patent and Trademark Office*